US010555245B2

(12) United States Patent
Chu et al.

(10) Patent No.: US 10,555,245 B2
(45) Date of Patent: Feb. 4, 2020

(54) OPERATING MODE NOTIFICATION FOR WIRELESS COMMUNICATION NETWORKS

(71) Applicant: Marvell World Trade Ltd., St. Michael (BB)

(72) Inventors: Liwen Chu, San Ramon, CA (US); Ken Kinwah Ho, San Jose, CA (US); Tianan Tim Ma, Palo Alto, CA (US); Hongyuan Zhang, Fremont, CA (US); Hui-Ling Lou, Sunnyvale, CA (US)

(73) Assignee: Marvell World Trade Ltd., St. Michael (BB)

( * ) Notice: Subject to any disclaimer, the term of this patent is extended or adjusted under 35 U.S.C. 154(b) by 11 days.

(21) Appl. No.: 15/955,449

(22) Filed: Apr. 17, 2018

(65) Prior Publication Data
US 2018/0302847 A1    Oct. 18, 2018

Related U.S. Application Data

(60) Provisional application No. 62/560,482, filed on Sep. 19, 2017, provisional application No. 62/536,360, (Continued)

(51) Int. Cl.
*H04W 8/22* (2009.01)
*H04W 72/12* (2009.01)
(Continued)

(52) U.S. Cl.
CPC ........... *H04W 48/12* (2013.01); *H04W 16/02* (2013.01); *H04W 72/048* (2013.01);
(Continued)

(58) Field of Classification Search
None
See application file for complete search history.

(56) References Cited

U.S. PATENT DOCUMENTS

2013/0301463 A1* 11/2013 Lee ..................... H04W 48/12
                                                        370/252
2014/0086131 A1*  3/2014 Seok .................... H04B 7/0452
                                                        370/311
(Continued)

FOREIGN PATENT DOCUMENTS

WO    WO-2017/011534 A1    1/2017

OTHER PUBLICATIONS

International Search Report and Written Opinion in International Patent Application No. PCT/US2018/027981, dated Jul. 17, 2018 (12 pages).

(Continued)

*Primary Examiner* — Duc T Duong

(57) ABSTRACT

A first communication device generates and transmits to a second communication device: first and second information elements that respectively indicate capabilities regarding physical layer protocol data units (PPDUs) conforming to a first communication protocol and a second communication protocol. The first communication device generates and transmits a MAC data unit that includes a number corresponding to a maximum number spatial streams supported by the first communication device. The number in the MAC data unit, and one or more of i) the first information element, ii) the second information element, and iii) other information in the MAC data unit, indicate first and second maximum numbers of spatial streams supported by the first communication device with respect to PPDUs conforming to the first communication protocol, and PPDUs conforming to the second communication protocol, respectively.

20 Claims, 9 Drawing Sheets

Related U.S. Application Data filed on Jul. 24, 2017, provisional application No. 62/486,195, filed on Apr. 17, 2017.

(51) Int. Cl.
| | |
|---|---|
| *H04W 80/02* | (2009.01) |
| *H04W 88/10* | (2009.01) |
| *H04W 48/12* | (2009.01) |
| *H04W 72/04* | (2009.01) |
| *H04W 76/11* | (2018.01) |
| *H04W 16/02* | (2009.01) |

(52) U.S. Cl.
CPC ... *H04W 72/0453* (2013.01); *H04W 72/1257* (2013.01); *H04W 76/11* (2018.02)

(56) References Cited

U.S. PATENT DOCUMENTS

| | | | |
|---|---|---|---|
| 2015/0063190 A1* | 3/2015 | Merlin | H04L 5/0037 370/312 |
| 2015/0173014 A1* | 6/2015 | Lee | H04W 52/0216 370/311 |
| 2016/0105836 A1 | 4/2016 | Seok | |
| 2016/0205065 A1* | 7/2016 | Ghosh | H04B 7/0452 |
| 2017/0141875 A1* | 5/2017 | Eliaz | H04L 1/0006 |
| 2017/0223710 A1* | 8/2017 | Cariou | H04W 40/244 |
| 2017/0289987 A1* | 10/2017 | Seok | H04W 74/00 |
| 2017/0367096 A1* | 12/2017 | Park | H04L 5/0053 |
| 2018/0324618 A1* | 11/2018 | Chay | H04W 72/1215 |

OTHER PUBLICATIONS

IEEE Std 802.11ac™-2013 "IEEE Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-425 (Dec. 18, 2013).

IEEE P802.11ax™/D1.0, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 453 pages (Nov. 2016).

IEEE P802.11ax™/D2.2, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 620 pages (Feb. 2018).

IEEE Std. 802.11n™ "IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, pp. 1-535 (Oct. 2009).

IEEE Std 802.11-REVmc™/D8.0 (revision of IEEE Std. 802.111™-2012) "Draft Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, 3774 pages (Aug. 2016).

\* cited by examiner

FIG. 2A

| Element ID 204 | Length 208 | VHT Capabilities Info 212 | Supported VHT-MCS and NSS Set 216 |
|---|---|---|---|
| 1 | 1 | 4 | 8 |

Octets:

| Rx VHT-MCS Map 230 | Rx Highest Supported Long GI Data Rate | Rsvd | Tx VHT-MCS Map 234 | Tx Highest Supported Long GI Data Rate | VHT Extended NSS BW Capable 238 | Rsvd |
|---|---|---|---|---|---|---|
| 16 | 13 | 3 | 16 | 13 | 1 | 2 |

Bits:

| Max VHT-MCS for 1 SS 254-1 | Max VHT-MCS for 2 SS 254-2 | Max VHT-MCS for 3 SS 254-3 | Max VHT-MCS for 4 SS 254-4 | Max VHT-MCS for 5 SS 254-5 | Max VHT-MCS for 6 SS 254-6 | Max VHT-MCS for 7 SS 254-7 | Max VHT-MCS for 8 SS 254-8 |
|---|---|---|---|---|---|---|---|
| 2 | 2 | 2 | 2 | 2 | 2 | 2 | 2 |

← 230

Bits:

| Channel Width 304 | 160/80+80 BW 312 | No LDPC 316 | Rx NSS 308 | Rx NSS Type 320 |
|---|---|---|---|---|
| 2 | 1 | 1 | 3 | 8 |

Bits:

FIG. 4

| Table Row | Transmitted Operating Mode field 300 | | VHT Capabilities of STA transmitting the Operating Mode field 300 | | NSS Support of STA transmitting the Operating Mode field 300 as a function of PPDU bandwidth (× Max VHT NSS) | | | | | Location of 160 MHz center frequency if BSS BW is 160 MHz | Location of secondary 80 MHz center frequency if BSS BW is 80+80 MHz |
|---|---|---|---|---|---|---|---|---|---|---|---|
| | Channel width 304 | 160/ 80+80 BW 312 | Supported Channel Width Set | Extended NSS BW Support | 20 MHz | 40 MHz | 80 MHz | 160 MHz | 80+80 MHz | | |
| 1 | 2 | 1 | 0 | 2 | 1 | 1 | 1 | 1/2 | 1/2 | CCSF2 | CCSF2 |
| 2 | 2 | 1 | 0 | 3 | 1 | 1 | 1 | 3/4 | 3/4 | CCSF2 | CCSF2 |
| 3 | 2 | 1 | 1 | 0 | 1 | 1 | 1 | 1 | | CCSF1 | |
| 4 | 2 | 1 | 1 | 1 | 1 | 1 | 1 | 1 | 1/2 | CCSF1 | CCSF2 |
| 5 | 2 | 1 | 1 | 2 | 1 | 1 | 1 | 1 | 3/4 | CCSF1 | CCSF2 |
| 6 | 2 | 1 | 1 | 3 | 2 | 2 | 2 | 2 | 1 | CCSF1 | CCSF1 |
| 7 | 2 | 1 | 2 | 0 | 1 | 1 | 1 | 1 | 1 | CCSF1 | CCSF1 |
| 8 | 2 | 1 | 2 | 3 | 2 | 2 | 2 | 1 | 1 | CCSF1 | CCSF1 |

412 — Channel width 304
416 — 160/80+80 BW 312
404 — Supported Channel Width Set
408 — Extended NSS BW Support
420-1 — 20 MHz
420-2 — 40 MHz
420-3 — 80 MHz
420-4 — 160 MHz
420-5 — 80+80 MHz

| Element ID 504 | Length 508 | Element ID Ext. | HE MAC Capabilities Info | HE PHY Capabilities Info 512 | Supported HE-MCS and NSS Set 516 | PPE Thresholds (optional) |
|---|---|---|---|---|---|---|
| 1 | 1 | 1 | 6 | 9 | 4, 8 or 12 | variable |

Octets:

| Rx HE-MCS Map ≤ 80 MHz 530 | Tx HE-MCS Map ≤ 80 MHz 534 | Rx HE-MCS Map 160 MHz 538 | Tx HE-MCS Map 160 MHz 542 | Rx HE-MCS Map 80+80 MHz 546 | Tx HE-MCS Map 80+80 MHz 550 |
|---|---|---|---|---|---|
| 2 | 2 | 0 or 2 | 0 or 2 | 0 or 2 | 0 or 2 |

Octets:

| Max HE-MCS for 1 SS 554-1 | Max HE-MCS for 2 SS 554-2 | Max HE-MCS for 3 SS 554-3 | Max HE-MCS for 4 SS 554-4 | Max HE-MCS for 5 SS 554-5 | Max HE-MCS for 6 SS 554-6 | Max HE-MCS for 7 SS 554-7 | Max HE-MCS for 8 SS 554-8 |
|---|---|---|---|---|---|---|---|
| 2 | 2 | 2 | 2 | 2 | 2 | 2 | 2 |

← 530

Bits:

FIG. 6

| Rx NSS 604 | Channel Width 608 | UL MU Disable | Tx NSTS 612 | Reserved |
|---|---|---|---|---|
| 3 | 2 | 1 | 3 | 3 |

← 600

Bits:

FIG. 7

| Table Row | Transmitted Operating Mode Control field 600 — Channel width 608 | VHT Capabilities of STA transmitting the Operating Mode Control field 600 — Supported Channel Width Set | VHT Capabilities of STA transmitting the Operating Mode Control field 600 — Extended NSS BW Support | NSS Support of STA transmitting the Operating Mode field 300 as a function of PPDU bandwidth (× Max VHT NSS) — 20 MHz | 40 MHz | 80 MHz | 160 MHz | 80+80 MHz | Location of 160 MHz center frequency if BSS BW is 160 MHz | Location of secondary 80 MHz center frequency if BSS BW is 80+80 MHz |
|---|---|---|---|---|---|---|---|---|---|---|
| 1 | 0 | 0-2 | 0-3 | 1 | | | | | | |
| 2 | 1 | 0-2 | 0-3 | 1 | 1 | | | | | |
| 3 | 2 | 0-2 | 0-3 | 1 | 1 | 1 | | | | |
| 4 | 3 | 0 | 1 | 1 | 1 | 1 | 1/2 | | CCSF2 | |
| 5 | 3 | 0 | 2 | 1 | 1 | 1 | 1/2 | 1/2 | CCSF2 | CCSF2 |
| 6 | 3 | 0 | 3 | 1 | 1 | 1 | 3/4 | 3/4 | CCSF2 | CCSF2 |
| 7 | 3 | 1 | 0 | 1 | 1 | 1 | 1 | | CCSF1 | |
| 8 | 3 | 1 | 1 | 1 | 1 | 1 | 1 | 1/2 | CCSF1 | CCSF2 |
| 9 | 3 | 1 | 2 | 1 | 1 | 1 | 1 | 3/4 | CCSF1 | CCSF2 |
| 10 | 3 | 1 | 3 | 2 | 2 | 2 | 2 | 1 | CCSF1 | CCSF1 |
| 11 | 3 | 2 | 0 | 1 | 1 | 1 | 1 | | CCSF1 | CCSF1 |
| 12 | 3 | 2 | 3 | 2 | 2 | 2 | 1 | 1 | CCSF1 | CCSF1 |

↑ 712   ↑ 704   ↑ 708   ↑ 720-1   ↑ 720-2   ↑ 720-3   ↑ 720-4   ↑ 720-5

← 700

OPERATING MODE NOTIFICATION FOR WIRELESS COMMUNICATION NETWORKS

CROSS REFERENCES TO RELATED APPLICATIONS

This application claims the benefit of U.S. Provisional Patent Application No. 62/486,195, entitled "Receive Operating Mode (ROM) and High-Efficiency (HE) Nss/MCS/BW Support," filed on Apr. 17, 2017, U.S. Provisional Patent Application No. 62/536,360, entitled "Method and Apparatus for Read Only Memory and High-Efficiency Nss/MCS/BW Support," filed on Jul. 24, 2017, and U.S. Provisional Patent Application No. 62/560,482, entitled "Method and Apparatus for Read Only Memory and High-Efficiency Nss/MCS/BW Support," filed on Sep. 19, 2017. The disclosures of all of the applications referenced above are expressly incorporated herein by reference in their entireties.

FIELD OF TECHNOLOGY

The present disclosure relates generally to wireless communication systems, and more particularly to informing communication devices of operating modes in a wireless communication system.

BACKGROUND

Wireless local area networks (WLANs) have evolved rapidly over the past decade, and development of WLAN standards such as the Institute for Electrical and Electronics Engineers (IEEE) 802.11 Standard family has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range. Work is underway on the IEEE 802.11ax Standard, which promises to provide even greater throughput, such as throughputs in the tens of Gbps range.

SUMMARY

In an embodiment, a method includes: generating, at a first communication device, a first information element that includes information regarding capabilities of the first communication device with respect to at least one of i) receiving physical layer protocol data units (PPDUs) conforming to a first communication protocol, and ii) transmitting PPDUs conforming to the first communication protocol; generating, at the first communication device, a second information element that includes information regarding capabilities of the first communication device with respect to at least one of i) receiving PPDUs conforming to a second communication protocol, and ii) transmitting PPDUs conforming to the second communication protocol; transmitting, by the first communication device, the first information element and the second information element to a second communication device to inform the second communication device of capabilities of the first communication device with respect to i) at least one of a) receiving PPDUs conforming to the first communication protocol, and b) transmitting PPDUs conforming to the first communication protocol, and ii) at least one of a) receiving PPDUs conforming to the second communication protocol, and ii) transmitting PPDUs conforming to the second communication protocol; generating, at the first communication device, a media access control protocol (MAC) data unit that includes a field having information regarding an operating mode of the first communication device, wherein the field includes a subfield with a number corresponding to a maximum number of spatial streams supported by the first communication device, and wherein the number in the subfield, together with information from one or more of i) the first information element, ii) the second information element, and iii) the field in the MAC data unit, indicates i) a first maximum number of spatial streams supported by the first communication device with respect to at least one of a) receiving PPDUs conforming to the first communication protocol via a first set of one or more channel frequency bandwidth configurations, and ii) transmitting PPDUs conforming to the first communication protocol via the first set of one or more channel frequency bandwidth configurations, and ii) a second maximum number of spatial streams supported by the first communication device with respect to at least one of a) receiving PPDUs conforming to the second communication protocol via a second set of one or more channel frequency bandwidth configurations, and ii) transmitting PPDUs conforming to the second communication protocol via the second set of one or more channel frequency bandwidth configurations; and transmitting, by the first communication device, the MAC data unit to the second communication device to inform the second communication device of the operating mode of the first communication device.

In another embodiment, an apparatus comprises: a network interface device associated with a first communication device. The network interface device includes: one or more integrated circuits (IC) devices, and a media access control protocol (MAC) processor implemented on the one or more IC devices. The MAC processor is configured to: generate a first information element that includes information regarding capabilities of the first communication device with respect to at least one of i) receiving physical layer protocol data units (PPDUs) conforming to a first communication protocol, and transmitting PPDUs conforming to the first communication protocol, and generate a second information element that includes information regarding capabilities of the first communication device with respect to at least one of i) receiving PPDUs conforming to a second communication protocol, and ii) transmitting PPDUs conforming to the second communication protocol. The one or more IC devices are configured to: transmit the first information element and the second information element to a second communication device to inform the second communication device of capabilities of the first communication device with respect to i) at least one of a) receiving PPDUs conforming to the first communication protocol, and b) transmitting PPDUs conforming to the first communication protocol, and ii) at least one of a) receiving PPDUs conforming to the second communication protocol, and b) transmitting PPDUs conforming to the second communication protocol. The MAC processor is further configured to: generate a MAC data unit that includes a field having information regarding an operating mode of the first communication device, wherein the field includes a subfield with a number corresponding to a maximum number of spatial streams supported by the first communication device, and wherein the number in the subfield, together with information from one or more of i) the first information element, ii) the second information element, and iii) the field in the MAC data unit, indicates i) a first maximum number of spatial streams supported by the first communication device with respect to at least one of a) receiving PPDUs conforming to the first communication protocol via a first set of one or more channel frequency bandwidth configurations, and b) transmitting PPDUs conforming to the first communication protocol via the first set of one or more channel frequency bandwidth configurations, and ii) a second maximum number of spatial streams supported by the first communication device with respect to at least one of a) receiving PPDUs conforming to the second communication protocol via a second set of one or more channel frequency bandwidth configurations, and b) transmitting PPDUs conforming to the second communication protocol via the second set of one or more channel frequency bandwidth configurations. The one or more IC devices are further configured to: transmit the MAC data unit to the second communication device to inform the second communication device of the operating mode of the first communication device.

In yet another embodiment, a method includes: receiving, at a first communication device, a first information element that includes information regarding capabilities of a second communication device with respect to at least of i) receiving physical layer protocol data units (PPDUs) conforming to a first communication protocol, and b) transmitting PPDUs conforming to the first communication protocol; receiving, at the first communication device, a second information element that includes information regarding capabilities of the second communication device with respect to at least one of i) receiving PPDUs conforming to a second communication protocol, and ii) transmitting PPDUs conforming to the second communication protocol; receiving, at the first communication device, a media access control protocol (MAC) data unit from the second communication device, wherein the MAC data unit includes a field corresponding to an indication of an operating mode of the second communication device, and wherein the field includes a subfield with a number corresponding to a maximum number of spatial streams supported by the second communication device; determining, at the first communication device, i) a first maximum number of spatial streams supported by the second communication device with respect to at least one of a) receiving PPDUs conforming to the first communication protocol via a first set of one or more channel frequency bandwidth configurations, and b) transmitting PPDUs conforming to the first communication protocol via the first set of one or more channel frequency bandwidth configurations, and ii) a second maximum number of spatial streams supported by the first communication device with respect to at least one of a) receiving PPDUs conforming to the second communication protocol via a second set of one or more channel frequency bandwidth configurations, and b) transmitting PPDUs conforming to the second communication protocol via the second set of one or more channel frequency bandwidth configurations, using the number in the subfield, together with information from one or more of i) the first information element, ii) the second information element, and iii) the field in the MAC data unit; and using, at the first communication device, at least one of i) the determined first maximum number of spatial streams, and ii) the determined second maximum number of spatial streams to determine at least one of i) a number of spatial streams to use when transmitting to the second communication device, and ii) a number of spatial streams to instruct the second communication device to use when transmitting to the first communication device.

In still another embodiment, an apparatus comprises: a network interface device associated with a first communication device. The network interface device includes: one or more integrated circuits (IC) devices, and a media access control protocol (MAC) processor implemented on the one or more IC devices. The MAC processor is configured to: receive a first information element that includes information regarding capabilities of a second communication device with respect to at least one of i) receiving physical layer protocol data units (PPDUs) conforming to a first communication protocol, and ii) transmitting PPDUs conforming to the first communication protocol, receive a second information element that includes information regarding capabilities of the second communication device with respect to at least one of i) receiving PPDUs conforming to a second communication protocol, and transmitting PPDUs conforming to the second communication protocol, receive a MAC data unit from the second communication device, wherein the MAC data unit includes a field corresponding to an indication of an operating mode of the second communication device, and wherein the field includes a subfield with a number corresponding to a maximum number of spatial streams supported by the second communication device, and determine i) a first maximum number of spatial streams supported by the second communication device with respect to at least one of a) receiving PPDUs conforming to the first communication protocol via a first set of one or more channel frequency bandwidth configurations, and b) transmitting PPDUs conforming to the first communication protocol via the first set of one or more channel frequency bandwidth configurations, and ii) a second maximum number of spatial streams supported by the first communication device with respect to at least one of a) receiving PPDUs conforming to the second communication protocol via a second set of one or more channel frequency bandwidth configurations, and b) transmitting PPDUs conforming to the second communication protocol via the second set of one or more channel frequency bandwidth configurations, using the number in the subfield, together with information from one or more of i) the first information element, ii) the second information element, and iii) the field in the MAC data unit. The one or more IC devices are further configured to: use at least one of i) the determined first maximum number of spatial streams, and ii) the determined second maximum number of spatial streams to determine at least one of i) a number of spatial streams to use when transmitting to the second communication device, and ii) a number of spatial streams to instruct the second communication device to use when transmitting to the first communication device.

BRIEF DESCRIPTION OF THE DRAWINGS

FIG. 2A is a diagram of an example information element for conveying information regarding modulation and coding scheme (MCS), spatial stream, and channel frequency bandwidth capabilities of a wireless communication device to another wireless communication device, according to an embodiment.

FIG. 2B is a diagram of an example field of the information element of FIG. 2A, according to an embodiment.

FIG. 2C is a diagram of an example subfield of the field of FIG. 2B, according to an embodiment.

FIG. 3 is a diagram of an example operating mode field that a wireless communication device uses to indicate to another wireless communication device an operating mode, according to an embodiment.

FIG. 4 is an example table corresponding to determining numbers of spatial streams (NSSs) supported by a wireless communication device at different channel frequency bandwidth configurations for transmissions according to a legacy wireless communication protocol, according to an embodiment.

FIG. 5A is a diagram of another example information element for conveying information regarding MCS, spatial stream, and channel frequency bandwidth capabilities of a wireless communication device to another wireless communication device, according to an embodiment.

FIG. 5B is a diagram of an example field of the information element of FIG. 5A, according to an embodiment.

FIG. 5C is a diagram of an example subfield of the field of FIG. 5B, according to an embodiment.

FIG. 6 is a diagram of another example operating mode field that a wireless communication device uses to indicate to another wireless communication device an operating mode, according to an embodiment.

FIG. 7 is another example table corresponding to determining NSSs supported by a wireless communication device at different channel frequency bandwidth configurations for transmissions according to the legacy wireless communication protocol, according to an embodiment.

DETAILED DESCRIPTION

Operating mode notification techniques described below are discussed in the context of wireless local area networks (WLANs) that utilize protocols the same as or similar to protocols defined by the 802.11 Standard from the Institute of Electrical and Electronics Engineers (IEEE) merely for explanatory purposes. In other embodiments, however, operating mode notification techniques are utilized in other types of wireless communication systems such as personal area networks (PANs), mobile communication networks such as cellular networks, metropolitan area networks (MANs), satellite communication networks, etc.

Figure 1:
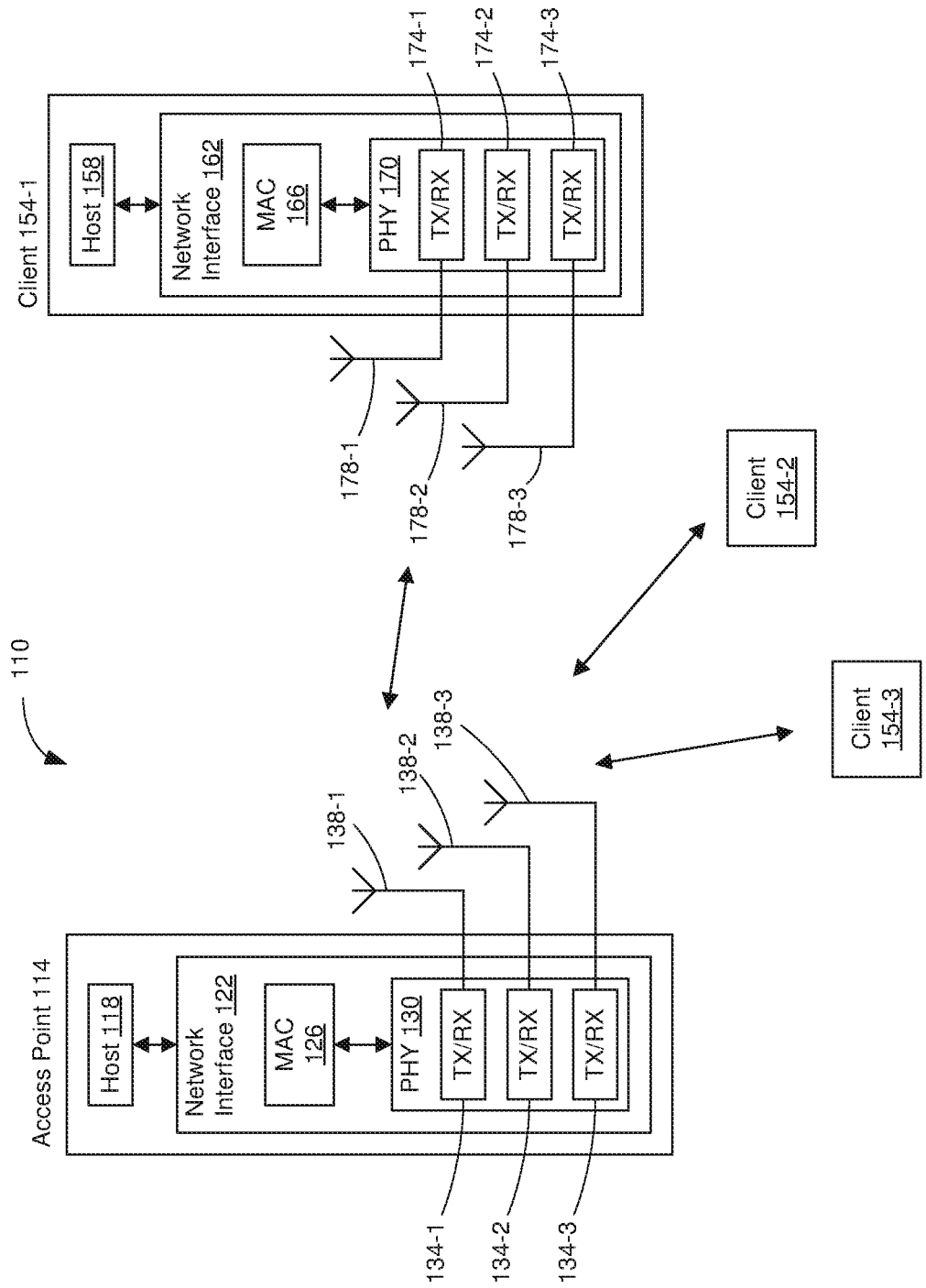
FIG. 1 is a block diagram of an example wireless local area network (WLAN), according to an embodiment.

FIG. 1 is a block diagram of an example wireless local area network (WLAN) 110, according to an embodiment. The WLAN 110 includes an access point (AP) 114 that comprises a host processor 118 coupled to a network interface device 122. The network interface 122 includes a medium access control (MAC) processor 126 and a physical layer (PHY) processor 130. The PHY processor 130 includes a plurality of transceivers 134, and the transceivers 134 are coupled to a plurality of antennas 138. Although three transceivers 134 and three antennas 138 are illustrated in FIG. 1, the AP 114 includes other suitable numbers (e.g., 1, 2, 4, 5, etc.) of transceivers 134 and antennas 138 in other embodiments. In some embodiments, the AP 114 includes a higher number of antennas 138 than transceivers 134, and antenna switching techniques are utilized.

The network interface 122 is implemented using one or more integrate circuits (ICs) configured to operate as discussed below. For example, the MAC processor 126 may be implemented, at least partially, on a first IC, and the PHY processor 130 may be implemented, at least partially, on a second IC. As another example, at least a portion of the MAC processor 126 and at least a portion of the PHY processor 130 may be implemented on a single IC. For instance, the network interface 122 may be implemented using a system on a chip (SoC), where the SoC includes at least a portion of the MAC processor 126 and at least a portion of the PHY processor 130.

In an embodiment, the host processor 118 includes a processor configured to execute machine readable instructions stored in a memory device (not shown) such as a random access memory (RAM), a read-only memory (ROM), a flash memory, etc. In an embodiment, the host processor 118 may be implemented, at least partially, on a first IC, and the network device 122 may be implemented, at least partially, on a second IC. As another example, the host processor 118 and at least a portion of the network interface 122 may be implemented on a single IC.

In various embodiments, the MAC processor 126 and/or the PHY processor 130 of the AP 114 are configured to generate data units, and process received data units, that conform to a WLAN communication protocol such as a communication protocol conforming to the IEEE 802.11 Standard or another suitable wireless communication protocol. For example, the MAC processor 126 may be configured to implement MAC layer functions, including MAC layer functions of the WLAN communication protocol, and the PHY processor 130 may be configured to implement PHY functions, including PHY functions of the WLAN communication protocol. For instance, the MAC processor 126 may be configured to generate MAC layer data units such as MAC service data units (MSDUs), MAC protocol data units (MPDUs), etc., and provide the MAC layer data units to the PHY processor 130. The PHY processor 130 may be configured to receive MAC layer data units from the MAC processor 126 and encapsulate the MAC layer data units to generate PHY data units such as PHY protocol data units (PPDUs) for transmission via the antennas 138. Similarly, the PHY processor 130 may be configured to receive PHY data units that were received via the antennas 138, and extract MAC layer data units encapsulated within the PHY data units. The PHY processor 130 may provide the extracted MAC layer data units to the MAC processor 126, which processes the MAC layer data units.

In connection with generating one or more radio frequency (RF) signals for transmission, the PHY processor 130 is configured to process (which may include modulating, filtering, etc.) data corresponding to a PPDU to generate one or more digital baseband signals, and convert the digital baseband signal(s) to one or more analog baseband signals, according to an embodiment. Additionally, the PHY processor 130 is configured to upconvert the one or more analog baseband signals to one or more RF signals for transmission via the one or more antennas 138.

In connection with receiving one or more signals RF signals, the PHY processor 130 is configured to downconvert the one or more RF signals to one or more analog baseband signals, and to convert the one or more analog baseband signals to one or more digital baseband signals. The PHY processor 130 is further configured to process (which may include demodulating, filtering, etc.) the one or more digital baseband signals to generate a PPDU.

The PHY processor 130 includes amplifiers (e.g., a low noise amplifier (LNA), a power amplifier, etc.), a radio frequency (RF) downconverter, an RF upconverter, a plurality of filters, one or more analog-to-digital converters (ADCs), one or more digital-to-analog converters (DACs), one or more discrete Fourier transform (DFT) calculators (e.g., a fast Fourier transform (FFT) calculator), one or more inverse discrete Fourier transform (IDFT) calculators (e.g., an inverse fast Fourier transform (IFFT) calculator), one or more modulators, one or more demodulators, etc.

The PHY processor 130 is configured to generate one or more RF signals that are provided to the one or more antennas 138. The PHY processor 130 is also configured to receive one or more RF signals from the one or more antennas 138.

The MAC processor 126 is configured to control the PHY processor 130 to generate one or more RF signals by, for example, providing one or more MAC layer data units (e.g., MPDUs) to the PHY processor 130, and optionally providing one or more control signals to the PHY processor 130, according to some embodiments. In an embodiment, the MAC processor 126 includes a processor configured to execute machine readable instructions stored in a memory device (not shown) such as a RAM, a read ROM, a flash memory, etc. In an embodiment, the MAC processor 126 includes a hardware state machine.

In an embodiment, the MAC processor 126 and the PHY processor 130 are configured to operate according to a first wireless communication protocol (e.g., as defined by the IEEE 802.11ax Standard or another suitable wireless communication protocol), and also according to a second wireless communication protocol (e.g., as defined by the IEEE 802.11ac Standard or another suitable wireless communication protocol) that is a legacy protocol with respect to the first wireless communication protocol. The second wireless communication protocol is sometimes referred to herein as a "legacy protocol." In some embodiments, the first wireless communication protocol permits the use of higher throughput modulation and coding schemes (MCSs) than permitted by the legacy protocol. For example, the IEEE 802.11ax Standard permits quadrature amplitude modulation (QAM) with a constellation size of 1024 (1024-QAM), whereas the IEEE 802.11ac Standard defines a highest-order modulation of 256-QAM. In some embodiments, the first wireless communication protocol permits the use of more spatial streams at a maximum channel bandwidth than permitted by the legacy protocol.

The WLAN 110 includes a plurality of client stations 154. Although three client stations 154 are illustrated in FIG. 1, the WLAN 110 includes other suitable numbers (e.g., 1, 2, 4, 5, 6, etc.) of client stations 154 in various embodiments. The client station 154-1 includes a host processor 158 coupled to a network interface device 162. The network interface 162 includes a MAC processor 166 and a PHY processor 170. The PHY processor 170 includes a plurality of transceivers 174, and the transceivers 174 are coupled to a plurality of antennas 178. Although three transceivers 174 and three antennas 178 are illustrated in FIG. 1, the client station 154-1 includes other suitable numbers (e.g., 1, 2, 4, 5, etc.) of transceivers 174 and antennas 178 in other embodiments. In some embodiments, the client station 154-1 includes a higher number of antennas 178 than transceivers 174, and antenna switching techniques are utilized.

The network interface 162 is implemented using one or more ICs configured to operate as discussed below. For example, the MAC processor 166 may be implemented on at least a first IC, and the PHY processor 170 may be implemented on at least a second IC. As another example, at least a portion of the MAC processor 166 and at least a portion of the PHY processor 170 may be implemented on a single IC. For instance, the network interface 162 may be implemented using an SoC, where the SoC includes at least a portion of the MAC processor 166 and at least a portion of the PHY processor 170.

In an embodiment, the host processor 158 includes a processor configured to execute machine readable instructions stored in a memory device (not shown) such as a RAM, a ROM, a flash memory, etc. in an embodiment, the host processor 158 may be implemented, at least partially, on a first IC, and the network device 162 may be implemented, at least partially, on a second IC. As another example, the host processor 158 and at least a portion of the network interface 162 may be implemented on a single IC.

In various embodiments, the MAC processor 166 and the PHY processor 170 of the client device 154-1 are configured to generate data units, and process received data units, that conform to the WLAN communication protocol or another suitable communication protocol. For example, the MAC processor 166 may be configured to implement MAC layer functions, including MAC layer functions of the WLAN communication protocol, and the PHY processor 170 may be configured to implement PHY functions, including PHY functions of the WLAN communication protocol. The MAC processor 166 may be configured to generate MAC layer data units such as MSDUs, MPDUs, etc., and provide the MAC layer data units to the PHY processor 170. The PHY processor 170 may be configured to receive MAC layer data units from the MAC processor 166 and encapsulate the MAC layer data units to generate PHY data units such as PPDUs for transmission via the antennas 178. Similarly, the PHY processor 170 may be configured to receive PHY data units that were received via the antennas 178, and extract MAC layer data units encapsulated within the PHY data units. The PHY processor 170 may provide the extracted MAC layer data units to the MAC processor 166, which processes the MAC layer data units.

The PHY processor 170 is configured to downconvert one or more RF signals received via the one or more antennas 178 to one or more baseband analog signals, and convert the analog baseband signal(s) to one or more digital baseband signals, according to an embodiment. The PHY processor 170 is further configured to process the one or more digital baseband signals to demodulate the one or more digital baseband signals and to generate a PPDU. The PHY processor 170 includes amplifiers (e.g., an LNA, a power amplifier, etc.), an RF downconverter, an RF upconverter, a plurality of filters, one or more ADCs, one or more DACs, one or more DFT calculators (e.g., an FFT calculator), one or more IDFT calculators (e.g., an IFFT calculator), one or more modulators, one or more demodulators, etc.

The PHY processor 170 is configured to generate one or more RF signals that are provided to the one or more antennas 178. The PHY processor 170 is also configured to receive one or more RF signals from the one or more antennas 178.

The MAC processor 166 is configured to control the PHY processor 170 to generate one or more RF signals by, for example, providing one or more MAC layer data units (e.g., MPDUs) to the PHY processor 170, and optionally providing one or more control signals to the PHY processor 170, according to some embodiments. In an embodiment, the MAC processor 166 includes a processor configured to execute machine readable instructions stored in a memory device (not shown) such as a RAM, a ROM, a flash memory, etc. In an embodiment, the MAC processor 166 includes a hardware state machine.

In an embodiment, the MAC processor 166 and the PHY processor 170 are configured to operate according to the first wireless communication protocol, and also according to the second wireless communication protocol.

In an embodiment, each of the client stations 154-2 and 154-3 has a structure that is the same as or similar to the client station 1541. Each of the client stations 154-2 and 154-3 has the same or a different number of transceivers and antennas. For example, the client station 154-2 and/or the client station 154-3 each have only two transceivers and two antennas (not shown), according to an embodiment.

In an embodiment, one or both of the client stations 154-2 and 154-3 are configured to operate according to the second wireless communication protocol, but not according to the first wireless communication protocol. Such client stations are referred to herein as "legacy client stations." Similarly, an access point that is similar to the AP 114 and is configured to operate according to the second wireless communication protocol, but not according to the first wireless communication protocol, is referred to herein as a "legacy AP." More generally, wireless communication devices that are configured to operate according to the second wireless communication protocol, but not according to the first wireless communication protocol, are referred to herein as a "legacy wireless communication devices."

In general, wireless communication devices configured to operate according to the first communication protocol tend to include more advanced hardware as compared to legacy devices, at least in some embodiments. For example, the MAC processor 126, the MAC processor 166, the PHY processor 130, and the PHY processor 170 are capable of processing data at higher rates than MAC processors and PHY processors of legacy wireless communication devices, according to an embodiment. As another example, the PHY processor 130, and the PHY processor 170 are capable of 1024-QAM modulation and demodulation, whereas a PHY processor of a legacy wireless communication device is capable of at most 256-QAM modulation and demodulation, according to an embodiment. On the other hand, some wireless communication devices configured to operate according to the first communication protocol are not capable of supporting all of the MCSs permitted by the first communication protocol, the number of spatial streams permitted by the first communication protocol, and/or all of the channel bandwidths permitted by the first communication protocol, due to cost constraints, power constraints, etc.

The first wireless communication protocol defines a plurality of MCSs, but not all of the MCSs are mandatory (e.g., some of the MCSs are optional), according to an embodiment. In other words, some wireless communication devices will not be capable of using some of the MCSs defined by the first wireless communication protocol. Additionally, the first wireless communication protocol defines a maximum number of spatial streams that can be employed, but the first communication protocol does not mandate that every wireless communication device must be capable of using the maximum number of spatial streams, according to an embodiment. In other words, some wireless communication devices will not be capable of using the maximum number of spatial streams defined by the first wireless communication protocol. Additionally, the first wireless communication protocol defines a plurality of different channel frequency bandwidths that can be employed, but the first communication protocol does not mandate that every wireless communication device must be capable of using all of the channel frequency bandwidths, according to an embodiment. In other words, some wireless communication devices will not be capable of using all of the channel frequency bandwidths defined by the first wireless communication protocol.

Similarly, the second wireless communication protocol defines a plurality of MCSs, but not all of the MCSs are mandatory (e.g., some of the MCSs are optional), according to an embodiment. In other words, some legacy wireless communication devices will not be capable of using some of the MCSs defined by the second wireless communication protocol. Additionally, the second wireless communication protocol defines a maximum number of spatial streams that can be employed, but the second communication protocol does not mandate that every wireless communication device must be capable of using the maximum number of spatial streams, according to an embodiment. In other words, some legacy wireless communication devices will not be capable of using the maximum number of spatial streams defined by the second wireless communication protocol. Additionally, the second wireless communication protocol defines a plurality of different channel frequency bandwidths that can be employed, but the second communication protocol does not mandate that every wireless communication device must be capable of using all of the channel frequency bandwidths, according to an embodiment. In other words, some legacy wireless communication devices will not be capable of using all of the channel frequency bandwidths defined by the second wireless communication protocol.

To support interoperability between wireless communication devices that have different MCS, spatial stream, and/or channel frequency bandwidth capabilities, wireless communication devices exchange capability information so that wireless communication devices are aware of the capabilities of other wireless communication devices with which they will be communicating. For example, FIG. 2A is a diagram of an example information element 200 for conveying information regarding MCS, spatial stream, and channel frequency bandwidth capabilities of a wireless communication device with respect to the legacy protocol, according to an embodiment. The information element 200 is a VHT capabilities element defined by the IEEE 802.11ac Standard, according to an embodiment. FIG. 2A indicates example lengths of various fields of the information element 200, according to an embodiment. In other embodiments, fields of the information element 200 have other suitable lengths. Additionally, in other embodiments, the information element 200 includes suitable fields other than those shown in FIG. 2A, and/or omits one or more of the fields shown in FIG. 2A.

The AP 114 (e.g., the MAC processor 130) includes the information element 200 in MAC management frames such as a beacon frame, a probe response frame, an association response frame, etc., for transmission to another wireless communication device to inform the other wireless communication device of capabilities of the AP 114 with regard to the reception and transmission of PPDUs that conform to the legacy protocol, according to an embodiment. Similarly, the client station 154-1 (e.g., the MAC processor 170) includes the information element 200 in MAC management frames such as an association request frame, a probe request frame, a reassociation request frame, etc., for transmission to another wireless communication device to inform the other wireless communication device of capabilities of the client station 154-1 with regard to the reception and transmission of PPDUs that conform to the legacy protocol, according to an embodiment.

The information element 200 includes an element identifier (ID) field 204 set to a value to indicate that the information element 200 is a particular information element defined by the legacy protocol corresponding to capabilities information (e.g., the VHT capabilities element defined by the IEEE 802.11ac Standard), according to an embodiment. The information element 200 also includes a length field 208 set to a value corresponding to a length of the information element 200.

The information element 200 also includes a capabilities information field (e.g., the VHT capabilities information field defined by the IEEE 802.11ac Standard, but with differences as described below) 212 that includes information regarding various capabilities of the wireless communication device, such as which channel frequency widths the wireless communication device is capable of supporting. In some embodiments, the capabilities information field 212 also includes other information regarding various capabilities of the wireless communication device such as one or more of i) whether the wireless communication device is capable of beamforming, ii) whether the wireless communication device is capable of space-time block encoding and decoding, iii) a maximum length of an aggregated MPDU (A-MPDU) that the wireless communication device can receive, etc.

In an embodiment, the capabilities information field 212 includes a supported channel width set subfield (not shown) to indicate which channel frequency bandwidths are supported by the wireless communication device. For example, a value of 0 indicates that the wireless communication device does not support bandwidths above 80 MHz (e.g., the device supports bandwidths of 20 MHz, 40 MHz, and 80 MHz); a value of 1 indicates that the wireless communication device supports a contiguous bandwidth of up to 160 MHz (e.g., the device supports bandwidths of 20 MHz, 40 MHz, 80 MHz, and a contiguous 160 MHz), but does not support a split frequency bandwidth of 80+80 MHz; a value of 2 indicates that the wireless communication device supports a contiguous bandwidth of up to 160 MHz (e.g., the device supports bandwidths of 20 MHz, 40 MHz, 80 MHz, and a contiguous 160 MHz) and a split frequency bandwidth of 80+80 MHz; and a value of 3 is reserved. In another embodiment, the supported channel width set subfield indicates other suitable channel frequency bandwidths.

Unlike the VHT capabilities information field defined by the IEEE 802.11ac Standard, the capabilities information field 212 includes an extended NSS bandwidth (BW) support subfield (not shown), which corresponds to reserved bits in the VHT capabilities information field defined by the IEEE 802.11ac Standard, according to an embodiment. Together with the supported channel width set subfield and a supported MCS and number of spatial streams (NSS) field (described below), the extended NSS BW support subfield indicates the channel frequency bandwidths and maximum NSS values per bandwidth supported by the wireless communication device. The information element 200 also includes the supported MCS and NSS field 216 that includes information regarding MCS and spatial stream capabilities of the wireless communication device. FIG. 2B is a diagram of an example supported MCS and NSS field 216, according to an embodiment. FIG. 2B indicates example lengths of various subfields of the supported MCS and NSS field 216, according to an embodiment. In other embodiments, subfields of the supported MCS and NSS field 216 have other suitable lengths. Additionally, in other embodiments, the supported MCS and NSS field 216 includes suitable subfields other than those shown in FIG. 2B, and/or omits one or more of the subfields shown in FIG. 2B.

The supported MCS and NSS field 216 includes a receive (Rx) MCS map subfield (e.g., similar to the Rx VHT-MCS map subfield defined by the IEEE 802.11ac Standard) 230. The Rx MCS map subfield 230 includes information indicating which MCSs (from among the plurality of MCSs specified by the legacy protocol) the wireless communication device is capable of receiving for various numbers of spatial streams (up to the maximum number of spatial streams defined by the legacy protocol). Similarly, the supported MCS and NSS field 216 includes a transmit (Tx) MCS map subfield (e.g., similar to the Tx VHT-MCS map subfield defined by the IEEE 802.11ac Standard) 234. The Tx MCS map subfield 234 includes information indicating which MCSs (from among the plurality of MCSs specified by the legacy protocol) the wireless communication device is capable of transmitting for various numbers of spatial streams (up to the maximum number of spatial streams defined by the legacy protocol).

Generally, different MCSs in a set of MCSs specified by the legacy protocol correspond to different transmission data rates, and the set of MCSs can be ordered and indexed according to transmission data rates, where a higher index corresponds to a higher data rate (e.g., index 0 (MCS 0) corresponds to a lowest data rate; index 1 (MCS 1) corresponds to a next higher data rate compared to index 0; index 2 (MCS 2) corresponds to a next higher data rate as compared to index 1; etc.). In an embodiment, MCS 9 is a highest data rate MCS defined by the legacy protocol. MCSs supported by the IEEE 802.11ac Standard are referred to herein as VHT-MCSs.

The supported MCS and NSS field 216 also includes an extended NSS BW capable subfield 238, according to an embodiment.

FIG. 2C is a diagram of an example Rx MCS map subfield 230, according to an embodiment. FIG. 2C indicates example lengths of various subfields of the Rx MCS map subfield 230, according to an embodiment. In other embodiments, subfields of the Rx MCS map subfield 230 have other suitable lengths. Additionally, in other embodiments, the Rx MCS map subfield 230 includes suitable subfields other than those shown in FIG. 2C, and/or omits one or more of the subfields shown in FIG. 2C.

The Rx MCS map subfield 230 includes respective subfields 254 to indicate a respective maximum MCS for a respective number of spatial streams, according to an embodiment. For example, the subfield 254-1 is for indicating a maximum MCS that the wireless communication device is capable of receiving when one spatial stream is being employed; the subfield 254-2 is for indicating a maximum MCS that the wireless communication device is capable of receiving when two spatial streams are being employed; the subfield 254-3 is for indicating a maximum MCS that the wireless communication device is capable of receiving when three spatial streams are being employed; etc.

The IEEE 802.11ac Standard defines values of the subfields 254 as follows: 0 indicates support for VHT-MCS 0-7 for the particular number of spatial streams; 1 indicates support for VHT-MCS 0-8 for the particular number of spatial streams; 2 indicates support for VHT-MCS 0-9 for the particular number of spatial streams; and 3 indicates that the particular number of spatial streams is not supported.

A wireless communication device (e.g., the MAC processing unit 130/170) receiving the information element 200 of FIG. 2A from another wireless communication device can determine a maximum NSS (Max VHT NSS) that can be used for a particular VHT-MCS when transmitting to the other communication device based on the Rx MCS map subfield 230 of FIG. 2C. For example, with the values of the subfields 254 defined by the IEEE 802.11ac Standard, the wireless communication device (e.g., the MAC processing unit 130/170) can determine the Max VHT NSS that can be used for VHT-MCS 9 as the subfield 254 that i) has a value of 3, and ii) corresponds to a highest NSS among the subfields 254. If none of the subfields 254 include the value 3, then the wireless communication device (e.g., the MAC processing unit 130/170) determines that VHT-MCS 9 cannot be used when transmitting to the other communication device, according to an embodiment.

The subfields 254 can be indexed by n, where n corresponds to a number of spatial streams (e.g., n is chosen from the {set 1, 2, 3, . . . , 8}), according to an embodiment. Max VHT NSS for a particular VHT-MCS is determined as the maximum value for n for which the subfield 254-n has a value that indicates support for that VHT-MCS (e.g., 0, 1, or 2 for VHT-MCS 0 VHT-MCS 7; 1 or 2 for VHT-MCS 8; 2 for VHT-MCS 9), according to an embodiment. As will be discussed below, Max VHT NSS can be reduced (with respect to the value of Max VHT NSS determined based on the subfields 254 as discussed above) in response to receiving further operating mode information from a communication device.

In some embodiments, a communication device can announce an operating mode regarding channel frequency bandwidth and/or NSS. For example, a device may transmit an operating mode field in a MAC action frame, such as an operating mode notification frame, where the operating mode field indicates a maximum channel frequency bandwidth that the communication device can utilize and/or a maximum NSS that the communication device can utilize. For instance, the communication device may reduce the maximum channel frequency bandwidth and/or the maximum NSS to reduce power consumption. As another example, the communication device may reduce the maximum channel frequency bandwidth and/or the maximum NSS when the communication device determines that the amount of data to be transmitted has fallen below a threshold.

FIG. 3 is a diagram of an example operating mode field 300 that is transmitted in a MAC action frame, such as an operating mode notification frame, or another suitable frame, according to an embodiment. The operating mode field 300 is similar to an operating mode field defined by the IEEE 802.11ac Standard.

The operating mode field 300 includes a channel width field 304. The IEEE 802.11ac Standard defines values of the channel width field 304 as follows: 0 indicates support for a 20 MHz-wide channel; 1 indicates support for a 40 MHz-wide channel; 2 indicates support for an 80 MHz-wide channel; and 3 indicates support for a 160 MHz-wide channel and/or an 80+80 MHz channel According to the IEEE 802.11ac Standard, a communication device can set the channel width field 304 to 0, 1, 2, or 3 to indicate a maximum channel frequency bandwidth supported by the communication device.

The operating mode field 300 also includes an Rx NSS field 308. According to an embodiment, a communication device sets the Rx NSS field 308 field to one minus a highest value of Max VHT NSS for channel bandwidths less than or equal to 80 MHz, for all VHT-MCSs. As will be described below, the Rx NSS field 308 field, in combination with other information in the information element 200 (FIGS. 2A-C), indicates a highest value of Max VHT NSS for channel bandwidth configurations greater than 80 MHz, for all VHT-MCSs.

The operating mode field 300 also further includes a 160/80+80 BW field 312 and a No LDPC field 316. The 160/80+80 BW field 312 and a No LDPC field 316 correspond to reserved bits in the operating mode field defined by the IEEE 802.11ac Standard. A communication device sets the No LDPC field 316 to indicate whether the communication device prefers to no receive LDPC-encoded PPDUs, according to an embodiment.

In an embodiment, a communication device can announce different NSS support for one or more wider channel frequency bandwidths as compared to one or more narrower channel frequency bandwidths. For example, a communication device can announce smaller NSS support for 160 MHz and 80+80 MHz channel frequency bandwidths as compared to 20 MHz, 40 MHz, and 80 MHz channel frequency bandwidths, according to an embodiment. In an embodiment, the communication device announces NSS support for channel bandwidths less than or equal to 80 MHz using the Rx NSS field 308, and announces different NSS support for channel bandwidth configurations greater than 80 MHz using the same value of the Rx NSS field 308 field, in combination with other information in the information element 200 (FIGS. 2A-C), as will be discussed below.

FIG. 4 is a table 400 corresponding to an example of determining NSS support for transmissions according to the legacy protocol, according to an embodiment. The table 400 illustrates the determination of NSS support for various channel frequency bandwidth configurations based on information received in the information element 200 of FIG. 2A and the operating mode field 300 of FIG. 3.

A column 404 corresponds to a value of the supported channel width set subfield in the capabilities information field 212 of the information element 200 (FIG. 2A). A column 408 corresponds to a value of the extended NSS BW support subfield in the capabilities information field 212 of the information element 200 (FIG. 2A). A column 412 corresponds to a value of the channel width subfield 304 in the operating mode field 300 (FIG. 3). A column 416 corresponds to a value of the 160/80+80 BW subfield 312 in the operating mode field 300 (FIG. 3).

Columns 420 correspond to respective factors, for various channel frequency bandwidth configurations, with which the Max VHT NSS (as indicated by the Rx NSS subfield 308 (FIG. 3)) is multiplied to determine supported NSSs for the various bandwidth configurations. For example, row 7 of table 400 includes a factor of one in all columns 420, which corresponds to the same Max VHT NSS (as indicated by the Rx NSS subfield 308 (FIG. 3)) for all bandwidth configurations. On the other hand, row 1 of table 400 includes a factor one in columns 420-1, 420-2, and 420-3, and a factor ½ in columns 420-4 and 420-5, which corresponds to only one half of Max VHT NSS (as indicated by the Rx NSS subfield 308 (FIG. 3)) is supported for the 160 MHz and 80+80 MHz bandwidth configurations, whereas the full Max VHT NSS is supported for the 20 MHz, 40 MHz, and 80 MHz bandwidth configurations.

In an embodiment, Max VHT NSS for a particular VHT-MCS is thus determined as the minimum of i) the maximum value for n for which the subfield 254-n (of the field 230 (FIGS. 2A-C)) has a value that indicates support for that VHT-MCS (e.g., 0, 1, or 2 for VHT-MCS 0-VHT-MCS 7; 1 or 2 for VHT-MCS 8; 2 for VHT-MCS 9), and ii) the maximum NSS as indicated by the Rx NSS subfield 308

(FIG. 3) further modified by a corresponding factor from columns 420 of table 400, according to an embodiment.

In an embodiment, NSS support is determined as the closest integer that is less than or equal to the product of multiplying a Max VHT NSS by a factor (from table 400).

Similar to the exchange of the capabilities element 200 of FIG. 2A in connection with PPDUs conforming to the legacy protocol, wireless communication devices exchange capability information regarding the first communication protocol so that wireless communication devices are aware of the capabilities of other wireless communication devices with which they will be communicating.

For example, FIG. 5A is a diagram of an example information element 500 for conveying information regarding MCS, spatial stream, and channel frequency bandwidth capabilities of a wireless communication device with respect to the first communication protocol, according to an embodiment. The information element 500 is referred to herein as an HE capabilities element. FIG. 5A indicates example lengths of various fields of the information element 500, according to an embodiment. In other embodiments, fields of the information element 500 have other suitable lengths. Additionally, in other embodiments, the information element 500 includes suitable fields other than those shown in FIG. 5A, and/or omits one or more of the fields shown in FIG. 5A.

The AP 114 (e.g., the MAC processor 130) includes the information element 500 in MAC management frames such as a beacon frame, a probe response frame, an association response frame, etc., for transmission to another wireless communication device to inform the other wireless communication device of capabilities of the AP 114 with regard to the reception and transmission of PPDUs that conform to the first communication protocol, according to an embodiment. Similarly, the client station 154-1 (e.g., the MAC processor 170) includes the information element 500 in MAC management frames such as an association request frame, a probe request frame, a reassociation request frame, etc., for transmission to another wireless communication device to inform the other wireless communication device of capabilities of the client station 154-1 with regard to the reception and transmission of PPDUs that conform to the first communication protocol, according to an embodiment.

The information element 500 includes an element ID field 504 set to a value to indicate that the information element 500 is a particular information element defined by the first communication protocol corresponding to capabilities information (e.g., the HE capabilities element), according to an embodiment. The information element 500 also includes a length field 508 set to a value corresponding to a length of the information element 500.

The information element 500 also includes a PHY capabilities information field 512 (HE PHY capabilities information field 512) that includes information regarding various capabilities of the wireless communication device, such as which channel frequency widths the wireless communication device is capable of supporting. In some embodiments, the HE PHY capabilities information field 512 also includes other information regarding various PHY-related capabilities of the wireless communication device such as one or more of i) whether the wireless communication device is capable of beamforming, etc.

In an embodiment, the HE PHY capabilities information field 512 includes a supported channel width set subfield (not shown) to indicate which of various channel frequency bandwidth configurations are supported by the wireless communication device.

The information element 500 also includes a supported MCS and NSS field (e.g., the Supported HE-MCS and NSS Set field) 516 that includes information regarding MCS and spatial stream capabilities of the wireless communication device. FIG. 5B is a diagram of an example supported HE-MCS and NSS field 516, according to an embodiment. FIG. 5B indicates example lengths of various subfields of the supported HE-MCS and NSS field 516, according to an embodiment. In other embodiments, subfields of the supported HE-MCS and NSS field 516 have other suitable lengths. Additionally, in other embodiments, the supported HE-MCS and NSS field 516 includes suitable subfields other than those shown in FIG. 5B, and/or omits one or more of the subfields shown in FIG. 5B.

The supported HE-MCS and NSS field 516 includes an Rx HE-MCS map for frequency bandwidths less than or equal to 80 MHz (Rx HE-MCS map≤80 MHz) subfield 530. The Rx HE-MCS map≤80 MHz subfield 530 includes information indicating which MCSs (from among the plurality of MCSs specified by the first communication protocol) the wireless communication device is capable of receiving for various numbers of spatial streams (up to the maximum number of spatial streams defined by the first communication protocol) in channel frequency bandwidths less than or equal to 80 MHz. Similarly, the supported HE-MCS and NSS field 516 includes a Tx HE-MCS map for frequency bandwidths less than or equal to 80 MHz (Tx HE-MCS map≤80 MHz) subfield 534. The Tx HE-MCS map≤80 MHz subfield 534 includes information indicating which MCSs (from among the plurality of MCSs specified by the first communication protocol) the wireless communication device is capable of transmitting for various numbers of spatial streams (up to the maximum number of spatial streams defined by the first communication protocol) in channel frequency bandwidths less than or equal to 80 MHz.

The supported HE-MCS and NSS field 516 also includes an Rx HE-MCS map for 160 MHz (Rx HE-MCS map 160 MHz) subfield 538. The Rx HE-MCS map 160 MHz 538 includes information indicating which MCSs (from among the plurality of MCSs specified by the first communication protocol) the wireless communication device is capable of receiving for various numbers of spatial streams (up to the maximum number of spatial streams defined by the first communication protocol) in a 160 MHz channel frequency bandwidth. Similarly, the supported HE-MCS and NSS field 516 includes a Tx HE-MCS map for 160 MHz (Tx HE-MCS map 160 MHz) subfield 542. The Tx HE-MCS map 160 MHz subfield 542 includes information indicating which MCSs (from among the plurality of MCSs specified by the first communication protocol) the wireless communication device is capable of transmitting for various numbers of spatial streams (up to the maximum number of spatial streams defined by the first communication protocol) in a 160 MHz channel frequency bandwidth.

The supported HE-MCS and NSS field 516 also includes an Rx HE-MCS map for 80+80 MHz (Rx HE-MCS map 80+80 MHz) subfield 546. The Rx HE-MCS map 80+80 MHz 546 includes information indicating which MCSs (from among the plurality of MCSs specified by the first communication protocol) the wireless communication device is capable of receiving for various numbers of spatial streams (up to the maximum number of spatial streams defined by the first communication protocol) in an 80+80 MHz channel frequency bandwidth. Similarly, the supported HE-MCS and NSS field 516 includes a Tx HE-MCS map for an 80+80 MHz (Tx HE-MCS map 80+80 MHz) subfield

550. The Tx HE-MCS map an 80+80 MHz subfield 550 includes information indicating which MCSs (from among the plurality of MCSs specified by the first communication protocol) the wireless communication device is capable of transmitting for various numbers of spatial streams (up to the maximum number of spatial streams defined by the first communication protocol) in an 80+80 MHz channel frequency bandwidth.

Generally, different MCSs in a set of MCSs specified by the first communication protocol correspond to different transmission data rates, and the set of MCSs can be ordered and indexed according to transmission data rates, where a higher index corresponds to a higher data rate (e.g., index 0 (MCS 0) corresponds to a lowest data rate; index 1 (MCS 1) corresponds to a next higher data rate compared to index 0; index 2 (MCS 2) corresponds to a next higher data rate as compared to index 1; etc.). In an embodiment, MCS 11 is a highest data rate MCS defined by the first communication protocol. MCSs supported by the first communication protocol are referred to herein as HE-MCSs. In an embodiment, the first communication protocol supports MCSs corresponding to higher transmission data rates than the legacy protocol. For example, the legacy protocol does not support transmission data rates corresponding to HE MCS 10 and HE MCS 11, in an embodiment.

FIG. 5C is a diagram of an example Rx HE-MCS map≤80 MHz subfield 530, according to an embodiment. FIG. 5C indicates example lengths of various subfields of the Rx HE-MCS map subfield 530, according to an embodiment. In other embodiments, subfields of the Rx HE-MCS map subfield 530 have other suitable lengths. Additionally, in other embodiments, the Rx HE-MCS map subfield 530 includes suitable subfields other than those shown in FIG. 5C, and/or omits one or more of the subfields shown in FIG. 5C.

The Rx HE-MCS map≤80 MHz subfield 530 includes respective subfields 554 to indicate a respective maximum MCS for a respective number of spatial streams for bandwidth configurations less than or equal to 80 MHz, according to an embodiment. For example, the subfield 554-1 is for indicating a maximum MCS that the wireless communication device is capable of receiving when one spatial stream is being employed for bandwidth configurations less than or equal to 80 MHz; the subfield. 554-2 is for indicating a maximum MCS that the wireless communication device is capable of receiving when two spatial streams are being employed for bandwidth configurations less than or equal to 80 MHz; the subfield 554-3 is for indicating a maximum MCS that the wireless communication device is capable of receiving when three spatial streams are being employed for bandwidth configurations less than or equal to 80 MHz; etc.

In an embodiment, values of the subfields 554 are as follows: 0 indicates support for HE-MCS 0-7 for the particular number of spatial streams; 1 indicates support for HE-MCS 0-9 for the particular number of spatial streams; 2 indicates support for VHT-MCS 0-11 for the particular number of spatial streams; and 3 indicates that the particular number of spatial streams is not supported.

A wireless communication device (e.g., the MAC processing unit 130/170) receiving the information element 500 of FIG. 5A from another wireless communication device can determine a maximum NSS (Max HE NSS) that can be used for a particular HE-MCS when transmitting to the other communication device using a bandwidth configuration less than or equal to 80 MHz based on the Rx HE-MCS map subfield 530 of FIG. 5C. For example, with the example values of the subfields 554 as described above, the wireless communication device (e.g., the MAC processing unit 130/170) can determine the Max HE NSS for bandwidth configuration less than or equal to 80 MHz that can be used for HE-MCS 11 as the subfield 554 that i) has a value of 3, and ii) corresponds to a highest NSS among the subfields 554. If none of the subfields 554 include the value 3, then the wireless communication device (e.g., the MAC processing unit 130/170) determines that HE-MCS 11 cannot be used when transmitting to the other communication device for bandwidth configuration less than or equal to 80 MHz, according to an embodiment.

The subfields 554 can be indexed by n, where n corresponds to a number of spatial streams (e.g., n is chosen from the set $\{1, 2, 3, \ldots, 8\}$), according to an embodiment. Max HE NSS for a particular HE-MCS is determined as the maximum value for n for which the subfield 554-$n$ has a value that indicates support for that HE-MCS (e.g., 0, 1, or 2 for HE-MCS 0-HE-MCS 7; 1 or 2 for HE-MCS 8 and HE-MCS 9; 2 for HE-MCS 10 and HE-MCS 11), according to an embodiment. As will be discussed below, Max HE NSS can be reduced (with respect to the value of Max HE NSS determined based on the subfields 554 as discussed above) in response to receiving further operating mode information from a communication device.

In an embodiment, the Rx HE-MCS map 160 MHz subfield 538 has a format the same as or similar to the subfield 530 of FIG. 5C. In an embodiment, the Rx HE-MCS map 80+80 MHz subfield 546 has a format the same as or similar to the subfield 530 of FIG. 5C. Thus, using the Rx HE-MCS map≤80 MHz subfield 530, the Rx HE-MCS map 160 MHz subfield 538, and the Rx HE-MCS map 80+80 MHz subfield 546, a communication device can report different support for different NSSs at different bandwidth configurations. The Max HE NSS for a particular bandwidth configuration is referred to herein as the "Max HE NSS at BW".

In various embodiments, the first communication protocol requires one of, or any suitable combination of two or more of, the following rules: i) a communication device shall have the same value of Max HE NSS for the Rx HE-MCS map≤80 MHz subfield 530 (FIGS. 5B, 5C) as the Max VHT NSS for the Rx VHT-MCS map subfield 530 (FIGS. 2B, 2C); ii) if the communication device supports a 160 MHz channel frequency bandwidth, the MAX VHT NSS for 160 MHz defined by the Rx VHT-MCS map subfield 530 (FIGS. 2B, 2C) and the extended NSS BW support subfield in the VHT capabilities element 200 (FIG. 2A) shall not be more than the MAX HE NSS defined by the Rx HE-MCS map 160 MHz subfield 538 (FIG. 5B); iii) if the communication device supports a 80+80 MHz channel frequency bandwidth configuration, the MAX VHT NSS for 80+80 MHz defined by the Rx VHT-MCS map subfield 530 (FIGS. 2B, 2C) and the extended NSS BW support subfield in the VHT capabilities element 200 (FIG. 2A) shall not be more than the MAX HE NSS defined by the Rx HE-MCS map 80+80 MHz subfield 546 (FIG. 5B); iv) for every NSS in the VHT capabilities element 200 (FIG. 2A) and the HE capabilities element 500 (FIG. 5A), if the highest indexed HE MCS is index 9 or higher, the highest indexed VHT MCS is index 9; and if the highest indexed HE MCS is index less than 9, the highest indexed VHT MCS is the same as the highest indexed HE MCS; v) a communication device shall not transmit a VHT capabilities element 200 (FIG. 2A) the supported channel width set subfield equal to three, or with the supported channel width set subfield equal to two and the extended NSS BW support subfield equal to three; vi) if the communication device supports a 80+80 MHz channel frequency bandwidth, the MAX HE NSS for 160 MHz defined by the Rx HE-MCS 160 MHz map subfield 538 (FIG. 5B) for an HE MCS shall not be more than the MAX HE NSS defined by the Rx HE-MCS map≤80 MHz subfield 538 (FIG. 5B) for the HE MCS; and/or vii) if the communication device supports an 80+80 MHz channel frequency bandwidth, the MAX HE NSS for 80+80 MHz defined by the Rx HE-MCS 80+80 MHZ map subfield 546 (FIG. 5B) for an HE MCS shall not be more than the MAX HE NSS defined by the Rx HE-MCS map≤80 MHz subfield 546 (FIG. 5B) for the HE MCS. Rule v above corresponds to row 6 and row 8 of table 400 (FIG. 4) being disallowed configurations.

In an embodiment, a communication device can indicate both i) an operating mode parameter(s) corresponding to reception of PPDUs conforming to the first communication protocol, and ii) an operating mode parameter(s) corresponding to reception of PPDUs conforming to the legacy protocol, using a single MAC frame. For example, as will be described in more detail below, the communication device can indicate both i) a maximum NSS corresponding to reception of PPDUs conforming to the first communication protocol, and ii) a maximum NSS corresponding to reception of PPDUs conforming to the legacy protocol, using the operating mode field 300, according to an embodiment.

In an embodiment, upon a first communication device receiving the operating mode field 300 from a second communication device (e.g., in a MAC action frame, such as an operating mode notification frame, or another suitable MAC frame), the first communication device resets a Max VHT NSS parameter for the second communication device to a value corresponding to the Rx NSS subfield. 308 in the operating mode field. 300. Additionally, the first communication device uses the value of the channel width subfield 304 and the value of the 160/80+80 BW subfield 312 to determine NSS support of the second communication device for legacy protocol communications at one or more bandwidth configurations according to the example table 400 (FIG. 4), according to an embodiment. For example, the value of the channel width subfield 304 and the value of the 160/80+80 BW subfield 312 indicate, according to the example table 400 (FIG. 4), support for one or more different NSSs at 160 MHz and 80+80 MHz bandwidth configurations for the legacy protocol.

Additionally, the first communication device determines NSS support of the second communication device for first communication protocol communications at one or more bandwidth configurations according to:

$$\text{Floor}(\text{Rx NSS from subfield 308} * (\text{Max NSS at BW}/\text{Max NSS at 80 MHz})) \qquad \text{Equ. 1}$$

where Max NSS at BW is the Max HE NSS for the bandwidth configuration indicated by the channel width subfield 304 and the subfield 312, and the Max NSS at 80 MHz is the Max NSS for bandwidths less than or equal to 80 MHz, as indicated by the Rx HE-MCS map≤80 MHz subfield 530 (FIGS. 5A-5C). The term Max NSS at BW/Max NSS at 80 MHz is a factor by which Rx NSS from subfield 308 is multiplied. In another embodiment, the first communication device determines NSS support of the second communication device for a specific MCS according to Equation 1. For example, the Max NSS at BW is the Max HE NSS at the specific MCS announced by the HE Capabilities element 500 (FIG. 5A) (which was transmitted by the second communication device) for a particular channel frequency bandwidth, and the Max NSS at 80 MHz is the Max NSS at <=80 MHz for the specific MCS announced by HE Capabilities element 500 (which was transmitted by the second communication device).

Thus, the single operating mode field 300 is used to both i) update an NSS support configuration for a communication device with respect to PPDUs transmitted according to the legacy protocol, and ii) update an NSS support configuration for the communication device with respect to PPDUs transmitted according to the first communication protocol, according to an embodiment.

FIG. 6 is a diagram of an example operating mode control field 600 that is transmitted in a MAC header of any suitable MAC frame, such as a MAC data frame, a MAC management frame, etc., according to an embodiment.

The operating mode control field 600 also includes an Rx NSS subfield 604. In an embodiment, a communication device sets the Rx NSS subfield 604 field to one minus a highest value of Max HE NSS for all HE-MCSs. In an embodiment, the value of the Rx NSS subfield 604 indicates a supported NSS for bandwidths of 80 MHz or less. Determining the supported NSS for bandwidths of 160 MHz and 80+80 MHz using the value of the Rx NSS subfield 604 are described below.

The operating mode control field 600 also includes a channel width subfield 608. In an embodiment, values of the channel width subfield 608 are defined as follows: 0 indicates support for a 20 MHz-wide channel; 1 indicates support for a 40 MHz-wide channel; 2 indicates support for an 80 MHz-wide channel; and 3 indicates support for a 160 MHz-wide channel and/or an 80+80 MHz channel. In an embodiment a communication device can set the channel width subfield 608 to 0, 1, 2, or 3 to indicate a maximum channel frequency bandwidth supported by the communication device.

The operating mode control field 600 also includes a number of transmit space-time streams (Tx NSTS) subfield 612. In an embodiment, a communication device sets the Tx NSTS subfield 612 field to one minus a highest value of a maximum NSTS that the communication device supports for transmission among all HE-MCSs. In an embodiment, the value of the Tx NSTS subfield 612 indicates a supported Tx NSTS for bandwidths of 80 MHz or less. Determining the supported NSTS for bandwidths of 160 MHz and 80+80 MHz using the value of the Tx NSTS subfield 612 are described below.

In an embodiment, a communication device can indicate both i) an operating mode parameter(s) corresponding to reception of PPDUs conforming to the first communication protocol, and ii) an operating mode parameter(s) corresponding to reception of PPDUs conforming to the legacy protocol, using a single MAC frame that includes the operating mode control field 600.

In an embodiment, upon a first communication device receiving the operating mode control field 600 from a second communication device (e.g., in a MAC data frame, a MAC management frame, or another suitable MAC frame), the first communication device resets a Max VHT NSS parameter for the second communication device to a value corresponding to the Rx NSS subfield 604 in the operating mode control field 600. Additionally, the first communication device uses the value of the channel width subfield 608 to determine NSS support of the second communication device for legacy protocol communications at one or more bandwidth configurations according to an example table 700 illustrated in FIG. 7, according to an embodiment.

FIG. 7 is a table 700 corresponding to an example of determining NSS support for transmissions according to the legacy protocol, according to an embodiment. The table 700 illustrates the determination of NSS support for various channel frequency bandwidth configurations based on information received in the information element 200 of FIG. 2A and the operating mode control field 600 of FIG. 6.

A column 704 corresponds to a value of the supported channel width set subfield in the capabilities information field 212 of the information element 200 (FIG. 2A). A column 708 corresponds to a value of the extended NSS BW support subfield in the capabilities information field 212 of the information element 200 (FIG. 2A). A column 712 corresponds to a value of the channel width subfield 608 in the operating mode control field 600 (FIG. 6).

Columns 720 correspond to respective factors, for various channel frequency bandwidth configurations, with which the Max VHT NSS (as indicated by the Rx NSS subfield 604 (FIG. 6)) is multiplied to determine supported NSSs for the various bandwidth configurations. For example, row 11 of table 700 includes a factor of one in all columns 720, which corresponds to the same Max VHT NSS (as indicated by the Rx NSS subfield 604 (FIG. 6)) for all bandwidth configurations. On the other hand, row 5 of table 700 includes a factor one in columns 720-1, 720-2, and 720-3, and a factor ½ in columns 720-4 and 720-5, which corresponds to only one half of Max VHT NSS (as indicated by the Rx NSS subfield 604 (FIG. 6)) is supported for the 160 MHz and 80+80 MHz bandwidth configurations, whereas the full Max VHT NSS is supported for the 20 MHz, 40 MHz, and 80 MHz bandwidth configurations.

Thus, the value of the channel width subfield 608 (FIG. 6), the value of the supported channel width set subfield in the capabilities information field 212 of the information element 200 (FIG. 2A), and the value of the extended NSS BW support subfield in the capabilities information field 212 of the information element 200 (FIG. 2 A) indicate, according to the example table 700 (FIG. 7), support for one or more different NSSs at 160 MHz and 80+80 MHz bandwidth configurations for the legacy protocol.

Additionally, the first communication device determines NSS support of the second communication device for first communication protocol communications at one or more bandwidth configurations according to:

$$\text{Floor}(\text{Rx NSS from subfield } 604*(\text{Max NSS at BW}/\text{Max NSS at 80 MHz})) \qquad \text{Equ. 2}$$

where Max NSS at BW is the Max HE NSS announced by the HE Capabilities element 500 (which was (transmitted by the second communication device) for the bandwidth configuration indicated by the channel width subfield 608, and the Max NSS at 80 MHz is the Max NSS for bandwidths less than or equal to 80 MHz, as indicated by the Rx HE-MCS map≤80 MHz subfield 530 (FIGS. 5A-5C). The term Max NSS at BW/Max NSS at 80 MHz is a factor by which Rx NSS from subfield 604 is multiplied. In another embodiment, the first communication device determines NSS support of the second communication device for a specific MCS according to Equation 2. For example, the Max NSS at BW is the Max HE NSS at the specific MCS announced by the HE Capabilities element 500 (FIG. 5A) (which was transmitted by the second communication device) for a particular channel frequency bandwidth, and the Max NSS at 80 MHz is the Max NSS at <=80 MHz for the specific MCS announced by HE Capabilities element 500 (which was transmitted by the second communication device).

Thus, the single operating control mode field 600 is used to both i) update an NSS support configuration for a communication device with respect to PPDUs transmitted according to the legacy protocol, and ii) update an NSS support configuration for the communication device with respect to PPDUs transmitted according to the first communication protocol, according to an embodiment.

In some embodiments, techniques similar to those described above are used by a first communication device to determine the Tx NSTS support of a second communication device with regard to transmissions by the second communication device. With regard to trigger-based transmissions, in which the first communication device prompts a transmission from the second communication device by transmitting a trigger frame, it may be useful for the first communication device to know the NSS support of the second communication device with regard to transmissions by the second communication device, according to some embodiments. For example, the trigger frame transmitted by the first communication device may specify the NSTS that the second communication device is to use when transmitting the trigger-based PPDU, according to an embodiment.

According to an embodiment, the first communication device determines NSTS support of the second communication device for first communication protocol transmissions by the second communication device at one or more bandwidth configurations according to:

$$\text{Floor}(\text{Tx NSTS from subfield } 612*(\text{Max Tx NSS at BW}/\text{Max Tx NSS at 80 MHz})) \qquad \text{Equ. 3}$$

where Max Tx NSS at BW is the Max HE Tx NSS announced by the HE Capabilities element 500 (which was (transmitted by the second communication device) for the bandwidth configuration indicated by the channel width subfield 608, and the Max Tx NSS at 80 MHz is the Max Tx NSS for bandwidths less than or equal to 80 MHz, as indicated by the Tx HE-MCS map≤80 MHz subfield 534 (FIGS. 5A-5C). The term Max Tx NSS at BW/Max Tx NSS at 80 MHz is a factor by which Tx NSTS from subfield 612 is multiplied. In another embodiment, the first communication device determines Tx NSTS support of the second communication device for a specific MCS according to Equation 3. For example, the Max Tx NSTS at BW is the Max HE NSTS at the specific MCS announced by the HE Capabilities element 500 (FIG. 5A) (which was transmitted by the second communication device) for a particular channel frequency bandwidth, and the Max Tx NSS at 80 MHz is the Max Tx NSS at <=80 MHz for the specific MCS announced by HE Capabilities element 500 (which was transmitted by the second communication device).

Figure 8:
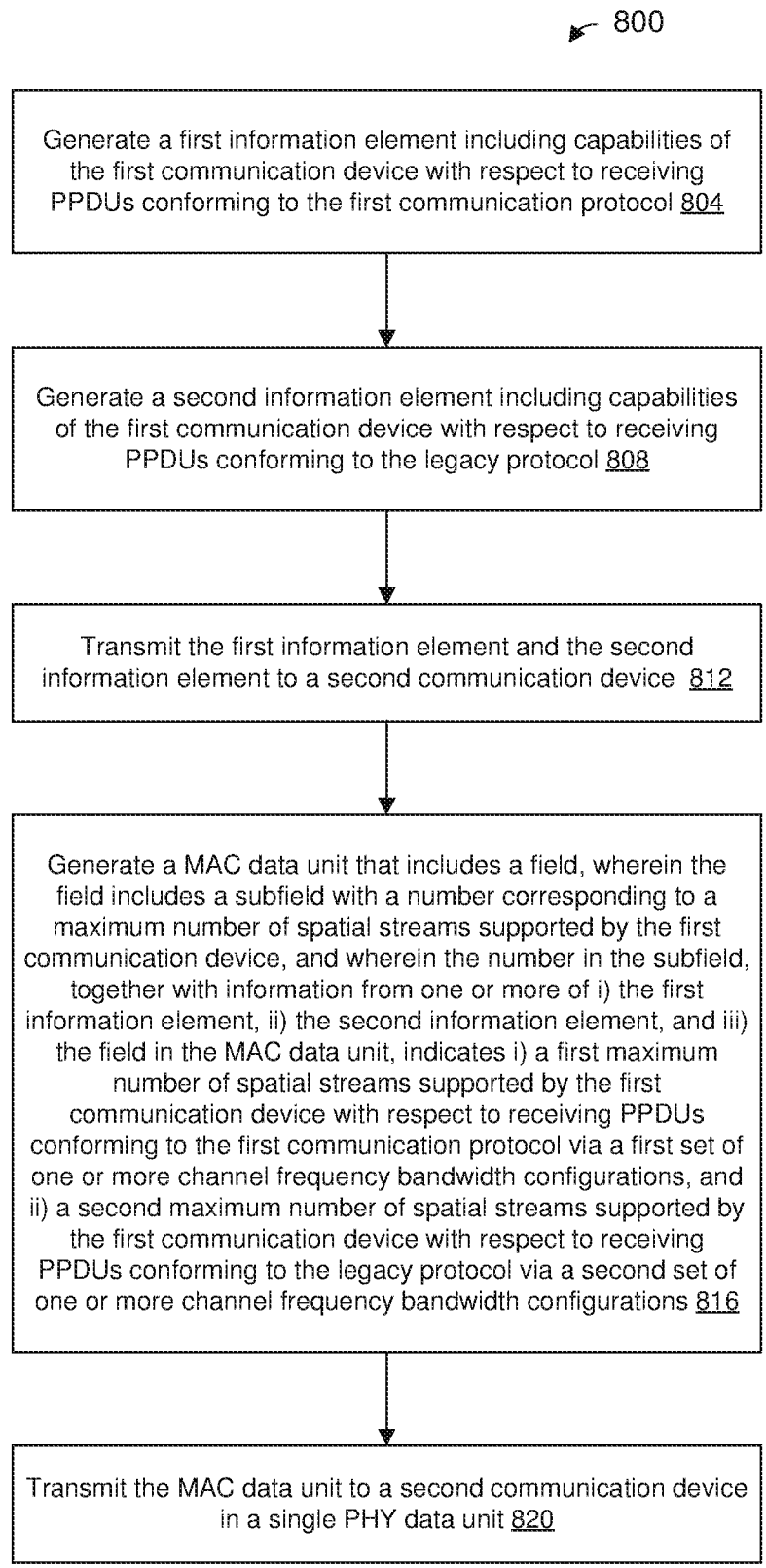
FIG. 8 is a flow diagram of an example method for a first communication device to inform a second communication device of an operating mode with regard to NSSs supported by the first communication device, according to an embodiment.

FIG. 8 is a flow diagram of an example method 800 for a first communication device to inform a second communication device of an operating mode with regard to numbers of spatial streams supported by the first communication device, according to an embodiment. In some embodiments, the network interface device 122 of FIG. 1 is configured to implement the method 800. In other embodiments, the network interface device 162 of FIG. 1 is configured to implement the method 800. For ease of explanation, the method 800 is described in the context of the network interface device 162 implementing the method 800. In other embodiments, however, the method 800 is implemented by the network interface device 122 or another suitable communication device.

At block 804, the first communication device (e.g., the network interface device 162) generates a first information element that includes capabilities of the first communication device with respect to at least one of i) receiving PPDUs conforming to the first communication protocol and ii) transmitting PPDUs conforming to the first communication protocol. In an embodiment, the first information element is the information element 500 discussed in connection with FIGS. 5A-C. In another embodiment, the first information element is another suitable information element that includes a plurality of fields indicating capabilities of the first communication device with respect to receiving PPDUs conforming to the first communication protocol, including one or more subfields indicating one or more numbers of spatial streams supported by the first communication device at one or more channel frequency configurations.

At block 808, the first communication device (e.g., the network interface device 162) generates a second information element that includes capabilities of the first communication device with respect to at least one of i) receiving PPDUs conforming to the legacy protocol and b) transmitting PPDUs conforming to the legacy protocol. In an embodiment, the second information element is the information element 200 discussed in connection with FIGS. 2A-C. In another embodiment, the second information element is another suitable information element that includes one or more fields indicating capabilities of the first communication device with respect to at least one of i) receiving PPDUs conforming to the legacy protocol, and ii) transmitting PPDUs conforming to the legacy protocol, including one or more subfields indicating a number of spatial streams supported by the first communication device.

At block 812, the first communication device (e.g., the network interface device 162) transmits i) the first information element generated at block 804, and ii) the second information element generated at block 808, to a second communication device (e.g., the AP 114). In an embodiment, the i) the first information element generated at block 804, and ii) the second information element generated at block 808 are transmitted in a single PPDU. In an embodiment, the i) the first information element generated at block 804, and ii) the second information element generated at block 808 are transmitted in an association request frame within the single PPDU. In some embodiments in which blocks 804, 808, and 812 are performed by the network interface device 122 of the AP 114, the i) the first information element generated at block 804, and ii) the second information element generated at block 808 are transmitted in a beacon frame or an association response frame within the single PPDU.

At block 816, the first communication device (e.g., the network interface device 162) generates a MAC data unit that includes a field, wherein the field includes a subfield with a number corresponding to a number of spatial streams supported by the first communication device, and wherein the number in the subfield, together with information from one or more of i) the first information element, ii) the second information element, and iii) the field in the MAC data unit, indicates i) a first maximum number of spatial streams supported by the first communication device with respect to at least one of receiving PPDUs conforming to the first communication protocol via a first set of one or more channel frequency bandwidth configurations, and b) transmitting PPDUs conforming to the first communication protocol via the first set of one or more channel frequency bandwidth configurations, and ii) a second maximum number of spatial streams supported by the first communication device with respect to at least one of a) receiving PPDUs conforming to the legacy protocol via a second set of one or more channel frequency bandwidth configurations, and b) transmitting PPDUs conforming to the legacy protocol via the second set of one or more channel frequency bandwidth configurations.

In an embodiment, the number in the subfield corresponds to i) a third maximum number of spatial streams supported by the first communication device with respect to at least one of a) receiving PPDUs conforming to the first communication protocol via a third set of one or more channel frequency bandwidth configurations, and b) transmitting PPDUs conforming to the first communication protocol via the third set of one or more channel frequency bandwidth configurations, and ii) a fourth maximum number of spatial streams supported by the first communication device with respect to at least one of a) receiving PPDUs conforming to the legacy protocol via a fourth set of one or more channel frequency bandwidth configurations and b) transmitting PPDUs conforming to the legacy protocol via the fourth set of one or more channel frequency bandwidth configurations. In an embodiment, the first maximum number of spatial streams corresponds to the third maximum number of spatial streams multiplied by a first factor, and the second maximum number of spatial streams corresponds to the fourth maximum number of spatial streams multiplied by a second factor. In an embodiment, the first factor corresponds to capabilities information in the first information element, and the second factor corresponds to capabilities information in the second information element.

In an embodiment, the first factor is determined according to Equation 1 (e.g., the first factor is Max NSS at BW/Max NSS at 80 MHz), and the second factor is determined according to table 400 (FIG. 4) using i) the supported channel width set subfield in the information element 200 (FIG. 2), and ii) the extended NSS BW support subfield in the information element 200 (FIG. 2). In an embodiment, the first factor is determined according to Equation 2 (e.g., the first factor is Max NSS at BW/Max NSS at 80 MHz), and the second factor is determined according to table 700 (FIG. 7) using i) the supported channel width set subfield in the information element 200 (FIG. 2), and ii) the extended NSS BW support subfield in the information element 200 (FIG. 2).

In an embodiment, the field of the MAC data unit generated at block 816 is the field 300 of FIG. 3. In an embodiment, the field of the MAC data unit generated at block 816 is the field 600 of FIG. 6.

In an embodiment, the MAC data unit is a MAC action frame associated with indicating an operating mode. In an embodiment, the MAC data unit is a MAC data frame, and the field of block 816 is included in a MAC header of the MAC data frame. In an embodiment, the MAC data unit is a MAC management frame, and the field of block 816 is included in a MAC header of the MAC management frame. Such MAC frames may be utilized when a communication devices wants to inform other communication devices of an operating mode of the communication device, such as when the communication device has changed its operating mode, the communication device has begun communicating with a new communication device, etc.

At block 820, the first communication device (e.g., the network interface device 162) transmits the MAC data unit generated at block 816 to the second communication device (e.g., the AP 114) to inform the second communication device of an operating mode with respect to at least a number of spatial streams supported by the first communication device. In an embodiment, the MAC data unit is transmitted in a single PHY data unit, and the method 800 includes generating the single PHY data unit to include the MAC data unit generated at block 816.

Figure 9:
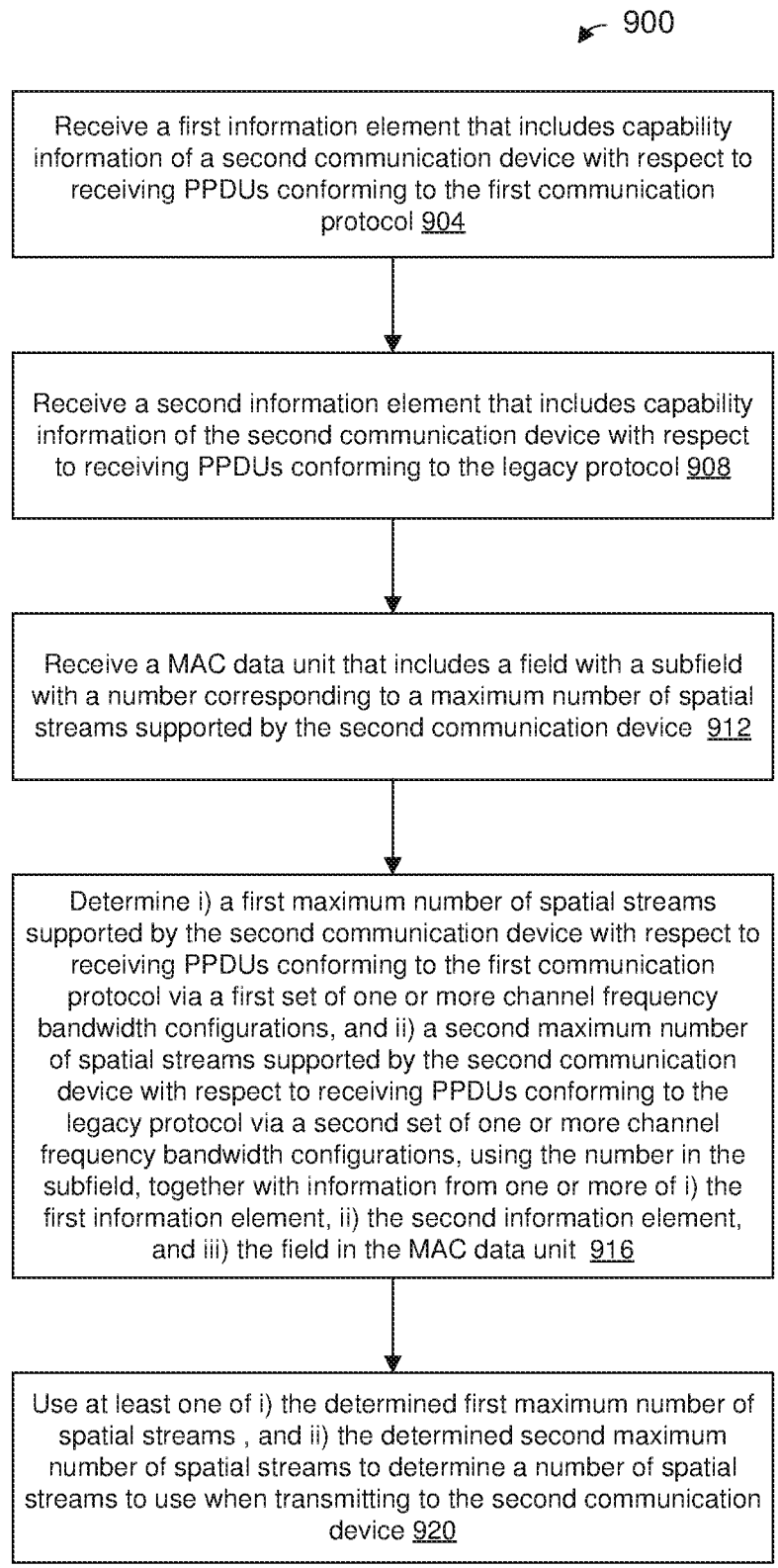
FIG. 9 is a flow diagram of an example method for a first communication device to determine a number of spatial streams to use when transmitting to a second communication device, according to an embodiment.

FIG. 9 is a flow diagram of an example method 900 for a first communication device to determine a number of spatial streams to use when transmitting to a second communication device, according to an embodiment. In some embodiments, the network interface device 122 of FIG. 1 is configured to implement the method 900. In other embodiments, the network interface device 162 of FIG. 1 is configured to implement the method 900. For ease of explanation, the method 800 is described in the context of the network interface device 122 implementing the method 800. In other embodiments, however, the method 900 is implemented by the network interface device 162 or another suitable communication device.

At block 904, the first communication device (e.g., the network interface device 122) receives a first information element that includes capabilities of the second communication device with respect to at least one of i) receiving PPDUs conforming to the first communication protocol, and ii) transmitting PPDUs conforming to the first communication protocol. In an embodiment, the first information element is the information element 500 discussed in connection with FIGS. 5A-C. In another embodiment, the first information element is another suitable information element that includes a plurality of fields indicating capabilities of the second communication device with respect to at least one of i) receiving PPDUs conforming to the first communication protocol, and ii) transmitting PPDUs conforming to the first communication protocol, including one or more subfields indicating one or more numbers of spatial streams supported by the second communication device at one or more channel frequency configurations.

At block 908, the first communication device (e.g., the network interface device 122) receives a second information element that includes capabilities of the second communication device with respect to at least one of i) receiving PPDUs conforming to the legacy protocol, and ii) transmitting PPDUs conforming to the legacy protocol. In an embodiment, the second information element is the information element 200 discussed in connection with FIGS. 2A-C. In another embodiment, the second information element is another suitable information element that includes one or more fields indicating capabilities of the second communication device with respect to at least one of i) receiving PPDUs conforming to the legacy protocol, and ii) transmitting PPDUs conforming to the legacy protocol, including one or more subfields indicating a number of spatial streams supported by the first communication device.

In an embodiment, the first information element (block 904), and the second information element (block 908) are received in a single PPDU. In an embodiment, the first information element (block 904), and the second information element (block 908) are received in an association request frame within the single PPDU. In some embodiments in which blocks 904 and 908 are performed by the network interface device 162 of the client station 154-1, the first information element (block 904), and the second information element (block 908) are received in a beacon frame or an association response frame within the single PPDU.

At block 912, the first communication device (e.g., the network interface device 122) receives a MAC data unit that includes a field, wherein the field includes a subfield with a number corresponding to a number of spatial streams supported by the second communication device. In an embodiment, the MAC data unit is a MAC action frame associated with indicating an operating mode. In an embodiment, the MAC data unit is a MAC data frame, and the field is included in a MAC header of the MAC data frame. In an embodiment, the MAC data unit is a MAC management frame, and the field is included in a MAC header of the MAC management frame. In an embodiment, the MAC data unit received at block 912 is received in a PHY data unit.

At block 916, the first communication device (e.g., the network interface device 122) uses the number in the subfield, together with information from one or more of i) the first information element, ii) the second information element, and iii) the field in the MAC data unit, to determine i) a first maximum number of spatial streams supported by the second communication device with respect to at least one of a) receiving PPDUs conforming to the first communication protocol via a first set of one or more channel frequency bandwidth configurations, and b) transmitting PPDUs conforming to the first communication protocol via the first set of one or more channel frequency bandwidth configurations, and ii) a second maximum number of spatial streams supported by the second communication device with respect to at least one of a) receiving PPDUs conforming to the legacy protocol via a second set of one or more channel frequency bandwidth configurations, and b) transmitting PPDUs conforming to the legacy protocol via the second set of one or more channel frequency bandwidth configurations.

In an embodiment, the number in the subfield corresponds to i) a third maximum number of spatial streams supported by the first communication device with respect to at least one of a) receiving PPDUs conforming to the first communication protocol via a third set of one or more channel frequency bandwidth configurations, and b) transmitting PPDUs conforming to the first communication protocol via the third set of one or more channel frequency bandwidth configurations, and ii) a fourth maximum number of spatial streams supported by the first communication device with respect to at least one of a) receiving PPDUs conforming to the legacy protocol via a fourth set of one or more channel frequency bandwidth configurations, and b) transmitting PPDUs conforming to the legacy protocol via the fourth set of one or more channel frequency bandwidth configurations. In an embodiment, determining the first maximum number of spatial streams includes multiplying the third maximum number of spatial streams by a first factor, and determining the second maximum number of spatial streams includes multiplying the fourth maximum number of spatial streams multiplied by a second factor. In an embodiment, block 916 includes i) determining the first factor using capabilities information in the first information element, and ii) determining the second factor using capabilities information in the second information element.

In an embodiment, the first factor is determined according to Equation 1 (e.g., the first factor is Max NSS at BW/Max NSS at 80 MHz), and the second factor is determined according to table 400 (FIG. 4) using i) the supported channel width set subfield in the information element 200 (FIG. 2), and ii) the extended NSS BW support subfield in the information element 200 (FIG. 2). In an embodiment, the first factor is determined according to Equation 2 (e.g., the first factor is Max NSS at BW/Max NSS at 80 MHz), and the second factor is determined according to table 700 (FIG. 7) using i) the supported channel width set subfield in the information element 200 (FIG. 2), and ii) the extended NSS BW support subfield in the information element 200 (FIG. 2).

In an embodiment, the field of the MAC data unit received at block 912 is the field 300 of FIG. 3. In an embodiment, the field of the MAC data unit received at block 912 is the field 600 of FIG. 6.

In an embodiment, the MAC data unit is a MAC action frame associated with indicating an operating mode. In an embodiment, the MAC data unit is a MAC data frame, and the field is included in a MAC header of the MAC data frame. In an embodiment, the MAC data unit is a MAC management frame, and the field is included in a MAC header of the MAC management frame.

At block 920, the first communication device (e.g., the network interface device 122) uses at least one of i) the determined first maximum number of spatial streams, and ii) the determined second maximum number of spatial streams to determine at least one of a) a number of spatial streams to use when transmitting one or more PPDUs to the second communication device, and b) a number of spatial streams to instruct the second communication device to use when transmitting to the first communication device.

Embodiment 1

A method includes: generating, at a first communication device, a first information element that includes information regarding capabilities of the first communication device with respect to at least one of i) receiving physical layer protocol data units (PPDUs) conforming to a first communication protocol, and ii) transmitting PPDUs conforming to the first communication protocol; generating, at the first communication device, a second information element that includes information regarding capabilities of the first communication device with respect to at least one of i) receiving PPDUs conforming to a second communication protocol, and ii) transmitting PPDUs conforming to the second communication protocol; transmitting, by the first communication device, the first information element and the second information element to a second communication device to inform the second communication device of capabilities of the first communication device with respect to i) at least one of a) receiving PPDUs conforming to the first communication protocol, and b) transmitting PPDUs conforming to the first communication protocol, and ii) at least one of a) receiving PPDUs conforming to the second communication protocol, and b) transmitting PPDUs conforming to the second communication protocol; generating, at the first communication device, a media access control protocol (MAC) data unit that includes a field having information regarding an operating mode of the first communication device, wherein the field includes a subfield with a number corresponding to a maximum number of spatial streams supported by the first communication device, and wherein the number in the subfield, together with information from one or more of i) the first information element, ii) the second information element, and iii) the field in the MAC data unit, indicates i) a first maximum number of spatial streams supported by the first communication device with respect to at least one of a) receiving PPDUs conforming to the first communication protocol via a first set of one or more channel frequency bandwidth configurations, and ii) transmitting PPDUs conforming to the first communication protocol via the first set of one or more channel frequency bandwidth configurations, and ii) a second maximum number of spatial streams supported by the first communication device with respect to at least one of a) receiving PPDUs conforming to the second communication protocol via a second set of one or more channel frequency bandwidth configurations, and ii) transmitting PPDUs conforming to the second communication protocol via the second set of one or more channel frequency bandwidth configurations; and transmitting, by the first communication device, the MAC data unit to the second communication device to inform the second communication device of the operating mode of the first communication device.

Embodiment 2

The method of embodiment 1, wherein: the number in the subfield corresponds to i) a third maximum number of spatial streams supported by the first communication device with respect to at least one of a) receiving PPDUs conforming to the first communication protocol via a third set of one or more channel frequency bandwidth configurations, and b) transmitting PPDUs conforming to the first communication protocol via the third set of one or more channel frequency bandwidth configurations, and ii) a fourth maximum number of spatial streams supported by the first communication device with respect to at least one of a) receiving PPDUs conforming to the second communication protocol via a fourth set of one or more channel frequency bandwidth configurations, and b) transmitting PPDUs conforming to the second communication protocol via the fourth set of one or more channel frequency bandwidth configurations; and the first maximum number of spatial streams corresponds to the third maximum number of spatial streams multiplied by a first factor, and the second maximum number of spatial streams corresponds to the fourth maximum number of spatial streams multiplied by a second factor.

Embodiment 3

The method of embodiment 2, wherein: the first factor corresponds to capabilities information in the first information element; and the second factor corresponds to capabilities information in the second information element.

Embodiment 4

The method of any of embodiments 1-3, wherein generating the MAC data unit includes: generating the MAC data unit to include the field in a MAC header of the MAC data unit.

Embodiment 5

The method of embodiment 4, wherein the MAC data unit is a MAC data frame or a MAC management frame.

Embodiment 6

An apparatus, comprising: a network interface device associated with a first communication device. The network interface device includes: one or more integrated circuits (IC) devices, and a media access control protocol (MAC) processor implemented on the one or more IC devices. The MAC processor is configured to: generate a first information element that includes information regarding capabilities of the first communication device with respect to at least one of i) receiving physical layer protocol data units (PPDUs) conforming to a first communication protocol, and transmitting PPDUs conforming to the first communication protocol, and generate a second information element that includes information regarding capabilities of the first communication device with respect to at least one of i) receiving PPDUs conforming to a second communication protocol, and ii) transmitting PPDUs conforming to the second communication protocol. The one or more IC devices are configured to: transmit the first information element and the second information element to a second communication device to inform the second communication device of capabilities of the first communication device with respect to i) at least one of a) receiving PPDUs conforming to the first communication protocol, and b) transmitting PPDUs conforming to the first communication protocol, and ii) at least one of a) receiving PPDUs conforming to the second communication protocol, and b) transmitting PPDUs conforming to the second communication protocol. The MAC processor is further configured to: generate a MAC data unit that includes a field having information regarding an operating mode of the first communication device, wherein the field includes a subfield with a number corresponding to a maximum number of spatial streams supported by the first communication device, and wherein the number in the subfield, together with information from one or more of i) the first information element, ii) the second information element, and iii) the field in the MAC data unit, indicates i) a first maximum number of spatial streams supported by the first communication device with respect to at least one of a) receiving PPDUs conforming to the first communication protocol via a first set of one or more channel frequency bandwidth configurations, and b) transmitting PPDUs conforming to the first communication protocol via the first set of one or more channel frequency bandwidth configurations, and ii) a second maximum number of spatial streams supported by the first communication device with respect to at least one of a) receiving PPDUs conforming to the second communication protocol via a second set of one or more channel frequency bandwidth configurations, and ii) transmitting PPDUs conforming to the second communication protocol via the second set of one or more channel frequency bandwidth configurations. The one or more IC devices are further configured to: transmit the MAC data unit to the second communication device to inform the second communication device of the operating mode of the first communication device.

Embodiment 7

The apparatus of embodiment 6, wherein: the number in the subfield corresponds to i) a third maximum number of spatial streams supported by the first communication device with respect to at least one of a) receiving PPDUs conforming to the first communication protocol via a third set of one or more channel frequency bandwidth configurations, and b) transmitting PPDUs conforming to the first communication protocol via the third set of one or more channel frequency bandwidth configurations, and ii) a fourth maximum number of spatial streams supported by the first communication device with respect to at least one of a) receiving PPDUs conforming to the second communication protocol via a fourth set of one or more channel frequency bandwidth configurations, and ii) transmitting PPDUs conforming to the second communication protocol via the fourth set of one or more channel frequency bandwidth configurations; and the first maximum number of spatial streams corresponds to the third maximum number of spatial streams multiplied by a first factor, and the second maximum number of spatial streams corresponds to the fourth maximum number of spatial streams multiplied by a second factor.

Embodiment 8

The apparatus of embodiment 7, wherein: the first factor corresponds to capabilities information in the first information element; and the second factor corresponds to capabilities information in the second information element.

Embodiment 9

The apparatus of any of embodiments 6-8, wherein the MAC processor is configured to: generate the MAC data unit to include the field in a MAC header of the MAC data unit.

Embodiment 10

The apparatus of embodiment 9, wherein the MAC data unit is a MAC data frame or a MAC management frame.

Embodiment 11

A method includes: receiving, at a first communication device, a first information element that includes information regarding capabilities of a second communication device with respect to at least one of i) receiving physical layer protocol data units (PPDUs) conforming to a first communication protocol, and ii) transmitting PPDUs conforming to the first communication protocol; receiving, at the first communication device, a second information element that includes information regarding capabilities of the second communication device with respect to at least one of i) receiving PPDUs conforming to a second communication protocol, and ii) transmitting PPDUs conforming to the second communication protocol; receiving, at the first communication device, a media access control protocol (MAC) data unit from the second communication device, wherein the MAC data unit includes a field corresponding to an indication of an operating mode of the second communication device, and wherein the field includes a subfield with a number corresponding to a maximum number of spatial streams supported by the second communication device; determining, at the first communication device, i) a first maximum number of spatial streams supported by the second communication device with respect to at least one of a) receiving PPDUs conforming to the first communication protocol via a first set of one or more channel frequency bandwidth configurations, and b) transmitting PPDUs conforming to the first communication protocol via the first set of one or more channel frequency bandwidth configurations, and ii) a second maximum number of spatial streams supported by the first communication device with respect to at least one of a) receiving PPDUs conforming to the second communication protocol via a second set of one or more channel frequency bandwidth configurations, and b) transmitting PPDUs conforming to the second communication protocol via the second set of one or more channel frequency bandwidth configurations, using the number in the subfield, together with information from one or more of i) the first information element, ii) the second information element, and iii) the field in the MAC data unit; and using, at the first communication device, at least one of i) the determined first maximum number of spatial streams, and ii) the determined second maximum number of spatial streams to determine at least one of a) a number of spatial streams to use when transmitting to the second communication device, and b) a number of spatial streams to instruct the second communication device to use when transmitting to the first communication device.

Embodiment 12

The method of embodiment 11, wherein: the number in the subfield corresponds to i) a third maximum number of spatial streams supported by the first communication device with respect to at least one of a) receiving PPDUs conforming to the first communication protocol via a third set of one or more channel frequency bandwidth configurations, and ii) transmitting PPDUs conforming to the first communication protocol via the third set of one or more channel frequency bandwidth configurations, and ii) a fourth maximum number of spatial streams supported by the first communication device with respect to at least one of a) receiving PPDUs conforming to the second communication protocol via a fourth set of one or more channel frequency bandwidth configurations, and b) transmitting PPDUs conforming to the second communication protocol via the fourth set of one or more channel frequency bandwidth configurations; determining the first maximum number of spatial streams includes multiplying the third maximum number of spatial streams multiplied by a first factor; and determining the second maximum number of spatial streams includes multiplying the fourth maximum number of spatial streams by a second factor.

Embodiment 13

The method of embodiment 12, wherein determining i) the first maximum number of spatial streams, and ii) the second maximum number of spatial streams includes: determining the first factor corresponds using capabilities information in the first information element; and determining the second factor using capabilities information in the second information element.

Embodiment 14

The method of any of embodiments 11-13, wherein the field corresponding to the indication of the operating mode of the second communication device is included in a MAC header of the MAC data unit.

Embodiment 15

The method of embodiment 14, wherein the MAC data unit is a MAC data frame or a MAC management frame.

Embodiment 16

An apparatus, comprising: a network interface device associated with a first communication device. The network interface device includes: one or more integrated circuits (IC) devices, and a media access control protocol (MAC) processor implemented on the one or more IC devices. The MAC processor is configured to: receive a first information element that includes information regarding capabilities of a second communication device with respect to at least one of i) receiving physical layer protocol data units (PPDUs) conforming to a first communication protocol, and ii) transmitting PPDUs conforming to the first communication protocol, receive a second info nation element that includes information regarding capabilities of the second communication device with respect to at least one of i) receiving PPDUs conforming to a second communication protocol, and ii) transmitting PPDUs conforming to the second communication protocol, receive a MAC data unit from the second communication device, wherein the MAC data unit includes a field corresponding to an indication of an operating mode of the second communication device, and wherein the field includes a subfield with a number corresponding to a maximum number of spatial streams supported by the second communication device, and determine i) a first maximum number of spatial streams supported by the second communication device with respect to at least one of a) receiving PPDUs conforming to the first communication protocol via a first set of one or more channel frequency bandwidth configurations, and b) transmitting PPDUs conforming to the first communication protocol via the first set of one or more channel frequency bandwidth configurations, and ii) a second maximum number of spatial streams supported by the first communication device with respect to at least one of a) receiving PPDUs conforming to the second communication protocol via a second set of one or more channel frequency bandwidth configurations, and b) transmitting PPDUs conforming to the second communication protocol via the second set of one or more channel frequency bandwidth configurations, using the number in the subfield, together with information from one or more of i) the first information element, ii) the second information element, and iii) the field in the MAC data unit. The one or more IC devices are further configured to: use at least one of i) the determined first maximum number of spatial streams, and ii) the determined second maximum number of spatial streams to determine at least one of a) a number of spatial streams to use when transmitting to the second communication device, and b) a number of spatial streams to instruct the second communication device to use when transmitting to the first communication device.

Embodiment 17

The apparatus of embodiment 16, wherein: the number in the subfield corresponds to i) a third maximum number of spatial streams supported by the first communication device with respect to at least one of a) receiving PPDUs conforming to the first communication protocol via a third set of one or more channel frequency bandwidth configurations, and b) transmitting PPDUs conforming to the first communication protocol via the third set of one or more channel frequency bandwidth configurations, and ii) a fourth maximum number of spatial streams supported by the first communication device with respect to at least one of a) receiving PPDUs conforming to the second communication protocol via a fourth set of one or more channel frequency bandwidth configurations, and ii) transmitting PPDUs conforming to the second communication protocol via the fourth set of one or more channel frequency bandwidth configurations; and the MAC processor is configured to: determine the first maximum number of spatial streams based on multiplying the third maximum number of spatial streams multiplied by a first factor, and determine the second maximum number of spatial streams based on multiplying the fourth maximum number of spatial streams by a second factor.

Embodiment 18

The apparatus of embodiment 17, wherein the MAC processor is configured to: determine the first factor corresponds using capabilities information in the first information element; and determine the second factor using capabilities information in the second information element.

Embodiment 19

The apparatus of any of embodiments 16-18, wherein the field corresponding to the indication of the change in operating mode of the second communication device is included in a MAC header of the MAC data unit.

Embodiment 20

The apparatus of embodiment 19, wherein the MAC data unit is a MAC data frame or a MAC management frame.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method, comprising:
generating, at a first communication device, a first information element that includes information regarding capabilities of the first communication device with respect to at least one of i) receiving physical layer protocol data units (PPDUs) conforming to a first communication protocol, and ii) transmitting PPDUs conforming to the first communication protocol;
generating, at the first communication device, a second information element that includes information regarding capabilities of the first communication device with respect to at least one of i) receiving PPDUs conforming to a second communication protocol, and ii) transmitting PPDUs conforming to the second communication protocol;
transmitting, by the first communication device, the first information element and the second information element to a second communication device to inform the second communication device of capabilities of the first communication device with respect to i) at least one of a) receiving PPDUs conforming to the first communication protocol, and b) transmitting PPDUs conforming to the first communication protocol, and ii) at least one of a) receiving PPDUs conforming to the second communication protocol, and b) transmitting PPDUs conforming to the second communication protocol;
generating, at the first communication device, a media access control protocol (MAC) data unit that includes a field having information regarding an operating mode of the first communication device, wherein the field includes a subfield with a number corresponding to a maximum number of spatial streams supported by the first communication device, and wherein the number in the subfield, together with information from one or more of i) the first information element, the second information element, and iii) the field in the MAC data unit, indicates i) a first maximum number of spatial streams supported by the first communication device with respect to at least one of a) receiving PPDUs conforming to the first communication protocol via a first set of one or more channel frequency bandwidth configurations, and b) transmitting PPDUs conforming to the first communication protocol via the first set of one or more channel frequency bandwidth configurations, and ii) a second maximum number of spatial streams supported by the first communication device with respect to at least one of a) receiving PPDUs conforming to the second communication protocol via a second set of one or more channel frequency bandwidth configurations, and b) transmitting PPDUs conforming to the second communication protocol via the second set of one or more channel frequency bandwidth configurations; and
transmitting, by the first communication device, the MAC data unit to the second communication device to inform the second communication device of the operating mode of the first communication device.

2. The method of claim 1, wherein:
the number in the subfield corresponds to i) a third maximum number of spatial streams supported by the first communication device with respect to at least one of a) receiving PPDUs conforming to the first communication protocol via a third set of one or more channel frequency bandwidth configurations, and b) transmitting PPDUs conforming to the first communication protocol via the third set of one or more channel frequency bandwidth configurations, and ii) a fourth maximum number of spatial streams supported by the first communication device with respect to at least one of a) receiving PPDUs conforming to the second communication protocol via a fourth set of one or more channel frequency bandwidth configurations, and b) transmitting PPDUs conforming to the second communication protocol via the fourth set of one or more channel frequency bandwidth configurations; and
the first maximum number of spatial streams corresponds to the third maximum number of spatial streams multiplied by a first factor, and the second maximum number of spatial streams corresponds to the fourth maximum number of spatial streams multiplied by a second factor.

3. The method of claim 2, wherein:
the first factor corresponds to capabilities information in the first information element; and
the second factor corresponds to capabilities information in the second information element.

4. The method of claim 1, wherein generating the MAC data unit includes:
generating the MAC data unit to include the field in a MAC header of the MAC data unit.

5. The method of claim 4, wherein the MAC data unit is a MAC data frame or a MAC management frame.

6. An apparatus, comprising:
a network interface device associated with a first communication device, wherein the network interface device includes:
one or more integrated circuits (IC) devices, and
a media access control protocol (MAC) processor implemented on the one or more IC devices;
wherein the MAC processor is configured to:
generate a first information element that includes information regarding capabilities of the first communication device with respect to at least one of i) receiving physical layer protocol data units (PPDUs) conforming to a first communication protocol, and ii) transmitting PPDUs conforming to the first communication protocol, and generate a second information element that includes information regarding capabilities of the first communication device with respect to at least one of i) receiving PPDUs conforming to a second communication protocol, and ii) transmitting PPDUs conforming to the second communication protocol;

wherein the one or more IC devices are configured to:
transmit the first information element and the second information element to a second communication device to inform the second communication device of capabilities of the first communication device with respect to i) at least one of a) receiving PPDUs conforming to the first communication protocol, and b) transmitting PPDUs conforming to the first communication protocol, and ii) at least one of a) receiving PPDUs conforming to the second communication protocol, and b) transmitting PPDUs conforming to the second communication protocol;

wherein the MAC processor is further configured to:
generate a MAC data unit that includes a field having information regarding an operating mode of the first communication device, wherein the field includes a subfield with a number corresponding to a maximum number of spatial streams supported by the first communication device, and wherein the number in the subfield, together with information from one or more of i) the first information element, ii) the second information element, and iii) the field in the MAC data unit, indicates i) a first maximum number of spatial streams supported by the first communication device with respect to at least one of a) receiving PPDUs conforming to the first communication protocol via a first set of one or more channel frequency bandwidth configurations, and b) transmitting PPDUs conforming to the first communication protocol via the first set of one or more channel frequency bandwidth configurations, and ii) a second maximum number of spatial streams supported by the first communication device with respect to at least one of a) receiving PPDUs conforming to the second communication protocol via a second set of one or more channel frequency bandwidth configurations, and b) transmitting PPDUs conforming to the second communication protocol via the second set of one or more channel frequency bandwidth configurations; and wherein the one or more IC devices are further configured to:
transmit the MAC data unit to the second communication device to inform the second communication device of the operating mode of the first communication device.

7. The apparatus of claim 6, wherein:
the number in the subfield corresponds to i) a third maximum number of spatial streams supported by the first communication device with respect to at least one of a) receiving PPDUs conforming to the first communication protocol via a third set of one or more channel frequency bandwidth configurations, and b) transmitting PPDUs conforming to the first communication protocol via the third set of one or more channel frequency bandwidth configurations, and ii) a fourth maximum number of spatial streams supported by the first communication device with respect to at least one of a) receiving PPDUs conforming to the second communication protocol via a fourth set of one or more channel frequency bandwidth configurations, and b) transmitting PPDUs conforming to the second communication protocol via the fourth set of one or more channel frequency bandwidth configurations; and the first maximum number of spatial streams corresponds to the third maximum number of spatial streams multiplied by a first factor, and the second maximum number of spatial streams corresponds to the fourth maximum number of spatial streams multiplied by a second factor.

8. The apparatus of claim 7, wherein:
the first factor corresponds to capabilities information in the first information element; and
the second factor corresponds to capabilities information in the second information element.

9. The apparatus of claim 6, wherein the MAC processor is configured to:
generate the MAC data unit to include the field in a MAC header of the MAC data unit.

10. The apparatus of claim 9, wherein the MAC data unit is a MAC data frame or a MAC management frame.

11. A method, comprising:
receiving, at a first communication device, a first information element that includes information regarding capabilities of a second communication device with respect to at least one of i) receiving physical layer protocol data units (PPDUs) conforming to a first communication protocol, and ii) transmitting PPDUs conforming to the first communication protocol;

receiving, at the first communication device, a second information element that includes information regarding capabilities of the second communication device with respect to at least one of i) receiving PPDUs conforming to a second communication protocol, and b) transmitting PPDUs conforming to the second communication protocol;

receiving, at the first communication device, a media access control protocol (MAC) data unit from the second communication device, wherein the MAC data unit includes a field corresponding to an indication of an operating mode of the second communication device, and wherein the field includes a subfield with a number corresponding to a maximum number of spatial streams supported by the second communication device;

determining, at the first communication device, i) a first maximum number of spatial streams supported by the second communication device with respect to at least one of a) receiving PPDUs conforming to the first communication protocol via a first set of one or more channel frequency bandwidth configurations, and b) transmitting PPDUs conforming to the first communication protocol via the first set of one or more channel frequency bandwidth configurations, and ii) a second maximum number of spatial streams supported by the first communication device with respect to at least one of a) receiving PPDUs conforming to the second communication protocol via a second set of one or more channel frequency bandwidth configurations, and b) transmitting PPDUs conforming to the second communication protocol via the second set of one or more channel frequency bandwidth configurations, using the number in the subfield, together with information from one or more of i) the first information element, ii) the second information element, and iii) the field in the MAC data unit; and using, at the first communication device, at least one of i) the determined first maximum number of spatial streams, and ii) the determined second maximum number of spatial streams to determine at least one of a) a number of spatial streams to use when transmitting to the second communication device, and b) a number of spatial streams to instruct the second communication to use when transmitting to the first communication device.

12. The method of claim 11, wherein:
the number in the subfield corresponds to i) a third maximum number of spatial streams supported by the first communication device with respect to at least one of a) receiving PPDUs conforming to the first communication protocol via a third set of one or more channel frequency bandwidth configurations, and b) transmitting PPDUs conforming to the first communication protocol via the third set of one or more channel frequency bandwidth configurations, and ii) a fourth maximum number of spatial streams supported by the first communication device with respect to at least one of a) receiving PPDUs conforming to the second communication protocol via a fourth set of one or more channel frequency bandwidth configurations, and b) transmitting PPDUs conforming to the second communication protocol via the fourth set of one or more channel frequency bandwidth configurations;
determining the first maximum number of spatial streams includes multiplying the third maximum number of spatial streams multiplied by a first factor; and
determining the second maximum number of spatial streams includes multiplying the fourth maximum number of spatial streams by a second factor.

13. The method of claim 12, wherein determining i) the first maximum number of spatial streams, and ii) the second maximum number of spatial streams includes:
determining the first factor corresponds using capabilities information in the first information element; and
determining the second factor using capabilities information in the second information element.

14. The method of claim 11, wherein the field corresponding to the indication of the operating mode of the second communication device is included in a MAC header of the MAC data unit.

15. The method of claim 14, wherein the MAC data unit is a MAC data frame or a MAC management frame.

16. An apparatus, comprising:
a network interface device associated with a first communication device, wherein the network interface device includes:
one or more integrated circuits (IC) devices, and
a media access control protocol (MAC) processor implemented on the one or more IC devices;
wherein the MAC processor is configured to:
receive a first information element that includes information regarding capabilities of a second communication device with respect to at least one of i) receiving physical layer protocol data units (PPDUs) conforming to a first communication protocol; and ii) transmitting PPDUs conforming to the first communication protocol,
receive a second information element that includes information regarding capabilities of the second communication device with respect to at least one of i) receiving PPDUs conforming to a second communication protocol, and ii) transmitting PPDUs conforming to the second communication protocol,
receive a MAC data unit from the second communication device, wherein the MAC data unit includes a field corresponding to an indication of an operating mode of the second communication device, and wherein the field includes a subfield with a number corresponding to a maximum number of spatial streams supported by the second communication device, and
determine i) a first maximum number of spatial streams supported by the second communication device with respect to at least one of a) receiving PPDUs conforming to the first communication protocol via a first set of one or more channel frequency bandwidth configurations, and b) transmitting PPDUs conforming to the first communication protocol via the first set of one or more channel frequency bandwidth configurations, and ii) a second maximum number of spatial streams supported by the first communication device with respect to at least one of a) receiving PPDUs conforming to the second communication protocol via a second set of one or more channel frequency bandwidth configurations, and b) transmitting PPDUs conforming to the second communication protocol via the second set of one or more channel frequency bandwidth configurations, using the number in the subfield, together with information from one or more of i) the first information element, ii) the second information element, and iii) the field in the MAC data unit; and wherein the one or more IC devices are further configured to:
use at least one of i) the determined first maximum number of spatial streams, and ii) the determined second maximum number of spatial streams to determine at least one of a) a number of spatial streams to use when transmitting to the second communication device, and b) a number of spatial streams to instruct the second communication to use when transmitting to the first communication device.

17. The apparatus of claim 16, wherein:
the number in the subfield corresponds to i) a third maximum number of spatial streams supported by the first communication device with respect to at least one of a) receiving PPDUs conforming to the first communication protocol via a third set of one or more channel frequency bandwidth configurations, and b) transmitting PPDUs conforming to the first communication protocol via the third set of one or more channel frequency bandwidth configurations, and ii) a fourth maximum number of spatial streams supported by the first communication device with respect to at least one of a) receiving PPDUs conforming to the second communication protocol via a fourth set of one or more channel frequency bandwidth configurations, and b) transmitting PPDUs conforming to the second communication protocol via the fourth set of one or more channel frequency bandwidth configurations; and
the MAC processor is configured to:
determine the first maximum number of spatial streams based on multiplying the third maximum number of spatial streams multiplied by a first factor, and
determine the second maximum number of spatial streams based on multiplying the fourth maximum number of spatial streams by a second factor.

18. The apparatus of claim 17, wherein the MAC processor is configured to:
   determine the first factor corresponds using capabilities information in the first information element; and
   determine the second factor using capabilities information in the second information element.

19. The apparatus of claim 16, wherein the field corresponding to the indication of the change in operating mode of the second communication device is included in a MAC header of the MAC data unit.

20. The apparatus of claim 19, wherein the MAC data unit is a MAC data frame or a MAC management frame.

* * * * *